US005596510A

United States Patent [19]
Boenke

[11] Patent Number: 5,596,510
[45] Date of Patent: Jan. 21, 1997

[54] TABLE-BASED LINEAR INTERPOLATION FOR COLOR CORRECTION SYSTEM AND METHOD

[75] Inventor: Mark Boenke, Santa Rosa, Calif.

[73] Assignee: Island Graphics, Larkspur, Calif.

[21] Appl. No.: 217,048

[22] Filed: Mar. 23, 1994

[51] Int. Cl.$^6$ ..................................................... G03F 3/08
[52] U.S. Cl. ......................... 364/526; 358/523; 358/525
[58] Field of Search ............................ 364/526; 358/500, 358/518, 519, 523–525, 520, 521, 522; 382/300; 395/131

[56] References Cited

U.S. PATENT DOCUMENTS

| | | |
|---|---|---|
| 4,275,413 | 6/1981 | Sakamoto et al. . |
| 4,477,833 | 10/1984 | Clark et al. . |
| 4,833,531 | 5/1989 | Abe et al. ................................. 358/523 |
| 4,839,721 | 6/1989 | Abdulwahab et al. .................. 358/518 |
| 4,992,861 | 2/1991 | D'Errico ................................... 358/500 |
| 5,241,373 | 8/1993 | Kanamori et al. . |
| 5,428,465 | 6/1995 | Kanamori et al. ....................... 358/523 |

OTHER PUBLICATIONS

Gennetten, K. D., "RGB to CMYK Conversion Using 3-D Barycentric Interpolation," *SPIE*, pp. 116–126, vol. 1909, 1993.

Kasson, J. M., et al, "A Tetrahedral Interpolation Technique for Color Space Conversion,", *SPIE*, pp. 127–138, vol. 1909, 1993.

Borzo, J., "Seybold to Showcase Hot Graphics Technologies," *INFOWORLD*, p. 17, Apr. 12, 1993.

Borzo, J., "PhotoStyler Speeds Editing," *INFOWORLD*, p. 17, Sep. 6, 1993.

Hartman, H., "Color by Numbers," *Publish*, pp. 46, 49, and 51, Nov. 1993.

Lee, D., "Lab Notes – Calibration – Is it Worth the Effort?," *Mac World*, pp. 89–90, Apr. 1992.

Fraser, B., "The Taming of the Hue," *Publish*, pp. 51–56, Aug. 1992.

Neugebauer, "Die theoretischen Grundlagen des Mehrfarbenbuchdrucks," *Zeitschrift für wissenschaftliche Photographie*, pp. 73–89, vol. 36, N.4, 1937, reprinted in *SPIE*, pp. 193–202, vol. 1184, 1989.

Yule and Neilsen, "The Penetration of Light into Paper and its Effect on Halftone Reproduction, " *Proceedings of the Technical Association for the Graphic Arts (TAGA)*, pp. 65–71, 1951.

Viggiano, "Modeling the Color of Multi–Colored Halftones," *Proceedings of the Technical Association for the Graphic Arts (TAGA)*, pp. 44–62, 1990.

Rhodes, Warren, "Fifty Years of the Neugebauer Equations," *SPIE*, pp. 7–17, vol. 1184, Neugebauer Memorial Seminar on Color Reproduction (1989).

*Primary Examiner*—James P. Trammell
*Attorney, Agent, or Firm*—Townsend and Townsend and Crew LLP

[57] ABSTRACT

The task of transforming a description of the color of a pixel from one color space (e.g., CMYK) to another (e.g., RGB) results from (1) obtaining a first approximation of the transformation from a base lookup table, and (2) interpolating between this first approximation and a set of neighboring approximations. The interpolation task is also carried out by a loop table, in this case a second table: the delta table. The use of lookup tables for both the first approximation and interpolation tasks produces color transformations which are extremely rapid. A simplifying assumption about the nature of the delta function, the assumption of collinearity of delta functions across broad color regions, makes it possible to use a delta table of small size.

5 Claims, 2 Drawing Sheets

TABLE-BASED LINEAR INTERPOLATION FOR COLOR CORRECTION SYSTEM AND METHOD

A portion of the disclosure of this patent document contains material which is subject to copyright protection. The copyright owner has no objection to the facsimile reproduction by anyone of the patent document or the patent disclosure as it appears in the Patent and Trademark Office patent files or records, but, otherwise, reserves all copyright rights whatsoever.

APPENDIX

This specification includes software listing Appendix A hereby expressly incorporated by reference for all purposes.

BACKGROUND OF THE INVENTION

The present invention relates generally to transformation of a digital description of a color of a picture element (pixel) from one color space to another, and, in particular, to accomplishing this transformation as rapidly as possible during real-time image editing on a digital computer.

Transformation of pixels from one color space to another color space is a well-understood problem in the prior art. The problem is especially acute in graphical image editing when a user attempts to match colors displayed on a computer monitor (one color space) to colors of printed objects (another color space). One difficulty is that often the two color spaces do not map easily between each other, such as for example in the scenario described above.

Colors displayed on a computer monitor are typically additive colors (i.e., orthogonal colors such as red, green and blue) that are added together to create white. Printing historically uses offset-printing techniques and has been performed using subtractive colors (i.e., orthogonal colors such as cyan, magenta, yellow and black) that are subtracted away to create white (the color of the underlying medium).

Since the graphical image editing scenario is a common one, the problem of matching colors in the cyan, magenta, yellow and black (CMYK) color space to colors in the red, green and blue (RGB) color space is typical of image editing systems and software. This problem occurs in other color spaces as well, such as CIE-XYZ, CIE-LUV, or CIE-LAB, or PhotoYcc, for example.

Colors in the offset-printing processes are commonly produced by printing four different layers or separations in one of each of the cyan, magenta, yellow and black inks. Within each layer, dots (halftone dots) of different sizes are printed over a regular grid of possible halftone dot locations. A computer description of the color of any one pixel includes a quadruplet of values, one for each of the four CMYK inks.

Typically, each color value lies within a range of 0 to 255, represented in the computer as an eight-bit byte. The magnitude of the value indicates the size (spatial area) of the halftone dot. When the magnitude is zero the dot has no size and is not drawn. When the magnitude is 255, the dot has maximum size and it fills its grid cell. Thus a CMYK quadruplet value of (c,m,y,k)=(0,0,0,0) indicates that there is no ink on the paper and so the color is the white of the paper. Conversely, a CMYK quadruplet value of (c,m,y,k)=(255, 255,255,255) indicates maximum ink on the paper and the color of the pixel is black.

The color of images displayed on cathode ray tubes (CRTs) used as video display monitors are commonly produced by passing an electron beam across arrays of triplets of phosphor dots, with each pixel represented by one set of the dot triplets. A phosphor dot, when stimulated, produces a red, green or blue light (RGB light). There is one of each of these three different types of phosphor dots in each of the triplets making up a pixel.

A computer description of the color of any one pixel includes a triplet of values, one for each of the three RGB phosphors. Often each color value lies within a range 0 to 255, again represented as an eight-bit byte. The magnitude of the color value indicates the amount of illumination being produced by the phosphor of the given color. When the magnitude is zero, the corresponding phosphor produces no illumination. When the magnitude is 255, the phosphor produces maximum illumination. Thus, an RGB triplet value of (r,g,b)=(0,0,0) indicates that the pixel at the appropriate position on the screen is black, and an RGB triplet value of (r,g,b)=(255,255,255) indicates that the pixel at the appropriate position on the screen is white.

Reflected light produces the color of CMYK pixels on a printed page. Projected light produces the color of RGB pixels on a CLOT. The underlying physics associated with these different mechanisms for producing color are profoundly different. The former (CMYK colors) are subtractive colors and the latter (RGB colors) are additive colors. The problem succinctly stated is thus: a practitioner of the graphics arts must be able to see an image on a CRT displayed using an additive RGB color representation that is as close as is possible to the subtractive CMYK color representation of that same image. A similar problem occurs when the practitioner has acquired an additive RGB representation of a scene from a color scanner, and needs to print a subtractive CMYK representation that is as close to the scanned original as possible.

In the construction of hardware and software applications for the graphic arts, it is important to be able to translate between additive RGB representations and subtractive CMYK representations while maintaining color fidelity.

Color scientists have proposed algorithms which will effect the transformation from subtractive CMYK color to additive RGB colors and vice-versa. A pioneering work related to transforming colors between these color spaces was produced by Neugebauer ("Die theoretischen Grundlagen des Mehrfarbenbuchdrucks"), hereby expressly incorporated by reference for all purposes. Neugebauer's original algorithms have been extended and refined by Yule and Neilsen ("The Penetration of Light into Paper and its Effect on Halftone Reproduction") and by Viggiano ("Modeling the Color of Multi-Colored Halftones"), both hereby expressly incorporated by reference for all purposes.

When converting from CMYK color to RGB color (or vice-versa) on a digital computer, the Neugebauer algorithm is time consuming, often so time consuming as to be unusable in a software application that makes the color transformations in real-time. The algorithms produced by the enhancements of Viggiano, and Yule and Neilsen are even more time consuming than Neugebauer's original algorithm. Therefore, real commercial systems and applications that transform between CMYK and RGB colors cannot use the computationally-intensive (and time consuming) algorithms for mapping colors from one color space to the other, if the mapping is to occur in real-time.

The prior art developed a table lookup process to enhance the speed of transformation between the color spaces relative to use of the algorithmic transformations. There are three stages in the evolution of table lookup as it exists in the prior art. If these table lookup methods are thought of as successors to the algorithmic methods, we have a four-stage history of color conversion:

(0) Algorithmic Color Conversion (as described above)
(1) Full-Table Lookup
(2) Sampled-Table Lookup
(3) Sampled-Table Lookup plus Algorithmic Interpolation.

Stages 1–3 identify table lookup techniques spanning a virtual evolution (see, for example, U.S. Pat. No. 5,241,373) towards improved color transformation performance. This evolution is virtual because few, if any actual implementations in the prior art, use the technology at stages (1) and (2). Rather, presentation of this evolution explains the need for the stage (3) technology that is actually used. Thinking of stages (1)–(3) as successors to the algorithmic methods provides the four-stage history of color conversion presented above.

The following examples all assume transformation from CMYK to RGB space, but the examples could be presented equally as well for translation from RGB to CMYK space, or for translations between other color spaces.

The idea behind color transformation by table lookup provides for constructing a table that is indexed by the C, M, Y and K values of a pixel. Any cell indexed by these CMYK values contains the RGB triplet corresponding to the particular index values identifying the cell. Use of table lookup to do color transformation requires a priori population of the table with transformed colors. Populating the table requires that for each quadruplet corresponding to a valid (C,M,Y,K) input, the corresponding (R,G,B) triplet is determined and then placed in the appropriate cell in the table.

The speed savings results from the observation that the process of populating the cells in the table can be done off-line (i.e., done separately, at a different place and time than that at which the application actually uses the table). Therefore, it is no longer necessary to calculate in real-time the (CMYK) to (RGB) equivalencies by algorithmic means. In fact, complex and time-consuming experimental methods can be optionally used instead. Note that the actual values in the table or the method selected to choose the values play no role in the operation of the table lookup method.

For implementations using a full-table lookup method (evolution stage 1), there is one cell in the table for every discernible input color. In the case of CMYK input color as described above, with each component (C, M, Y, or K) represented by a an eight-bit byte, the byte is typically represented as an unsigned binary number. One preferred transformation method (in terms of accuracy) includes a lookup table indexed by the four C, M, Y and K values to access a particular cell to produce an associated R value. Such a table has thirty-two (8 bits/input * 4 inputs) bits of input. Therefor, such a table has $2^{32}$ cells. Each such cell stores a one byte value representing the value of the transformed color, such as the R value. A full lookup table for transforming CMYK values to an R value would, therefore, occupy four billion bytes. To transform the CMYK values to the other components, i.e., the G and B components, requires similarly sized tables. Thus, a full table lookup for accurately transforming a particular CMYK value to a corresponding RGB value requires a total of twelve billion bytes.

A table of such size is much too large to be stored and manipulated effectively by current desktop computer systems. There is potentially great costs associated with populating such a table. Since full-table lookup methods produce exorbitantly large tables, a method using smaller tables is desirable.

One way to reduce the number of entries in a table is to use a sampled table. A sampled table does not have a cell for each possible (CMYK) input quadruplet, but has a cell for only a sample (a subset) of these inputs. For example, in the case of the example identified above when there are 256 possible values for each of C, M, Y and K, such a table can be sampled, by building a new table that contains entries for a reduced number of indices along each of the tables' axes (C, M, Y, and K), with a corresponding reduction in the number of cells and the size of the table.

A simple way to reduce the number of indices is to decrease their number by a factor which is a power of 2. Reducing the number of indices in this fashion is done, in turn, by retaining only those indices that, when reexpressed as binary numbers, have their least-significant n bits (n>0 and n<8) set equal to zero. The numbers, n, of bits set to zero can differ for the four axes (the four color indices), and can be denoted by nC, nM, nY and nK. For example, a particular application may set nC=nM=nY=4, and set nK=3. This would provide for more accurate transformations of black, a color that the human eye is especially sensitive to.

Only using selected ones of the most-significant bits of CMYK color values means that along the cyan, magenta and yellow axes, the table would use only those numbers having a binary expression of the form XXXX0000. Specifically, these numbers are 0, 16, 32, 48, . . . , 240. As a consequence, there will be only 16 possible cyan index values (and similarly 16 magenta index values and 16 black index values). Since nK was set equal to 3 in this example, along the black axis the sampled table will retain only those numbers whose binary expression is of the form XXXXX000. These are, specifically, the numbers 0, 8, 16, 24, 32, . . . , 248. For black then, there will be 32 possible black index values.

The number of bits required to express each component is four for C, M, and Y, and is five for K. This means that the sampled table example uses a total of 17 (3*4+5) bits for indexing, or a total of 131072 cell entries. For transforming the CMYK to RGB, each CMYK value has a corresponding R value, a corresponding G value and a corresponding B value. Thus, the size of the sampled lookup table must be 131072*3, or 393210 bytes. As compared to the full table lookup, the size of the sampled lookup table is now much more manageable (393210 versus four billion bytes) for each color component.

In operation, there is a simple, but inelegant, way to implement a sampled lookup table to convert (CMYK) to (RGB) values. Whenever a given (CMYK) quadruplet is input, its components, C, M, Y, and K are reexpressed as binary numbers. The least-significant nC, nM, nY and nK bits of each eight bit byte are set to zero, thus yielding a new quadruplet (C0, M0, Y0, K0). This truncated quadruplet is then used as the index into the sampled table, and a corresponding (RGB) triplet is looked up. The system associates this (RGB) triplet with the ORIGINAL, untruncated, (CMYK) quadruplet.

The method described above for implementing the sampled lookup table is inelegant because it produces a number of errors, including what K. Douglas Gennetten in his article, "RGB to CMYK conversion using 3-D barycentric interpolation" (hereby expressly incorporated by reference for all purposes) calls Type 2 errors. Type 2 errors are "systematically arranged step errors. This type of error is unique to digital imaging and is distinguishable by its characteristic false contouring—an effect similar to posterization in the graphic arts. A common cause of Type 2 error in inexpensive PC-based systems is an inadequate number of gray levels somewhere within the image path."

In other words, since the least-significant bits of the CMYK values are not used, one RGB value represents several different CMYK values (i.e., several different CMYK values all map to the same RGB value). If the image being converted includes a color gradient gradually ranging over a large enough CMYK spectrum, bands of color appear in the converted image rather than the desired gradient.

Thus, the stage 1 evolution is impractical because it is too memory intensive and the stage 2 evolution has better memory requirements but it provides unacceptable accuracy. The stage 3 evolution is a compromise between the high quality color conversion, as is possible under evolution stage 1 and the memory savings of stage 2, that adds an interpolation process to the stage 2 sampled table lookup.

One example of a stage 3 design is described further. Let (C,M,Y,K) be an original CMYK input quadruplet, and (R,G,B) be the RGB triplet that results from the sampled table lookup plus interpolation method. Let (C0, M0, Y0, K0) be the truncated (C,M,Y,K) as described above. In other words, C0 is the value of C after its least-significant nC bits have bit set equal to zero. C0 is the largest cyan value that (a) is smaller than or equal to C, and (b) is an index in the Sampled Lookup Table. Let (C1, M1, Y1, K1) be, respectively, the smallest CMYK values that are larger than (C0, M0, Y0, K0), respectively, but that are also indices in the sampled lookup table.

For example, when C=33, then C0=32 (the largest number <=C that is an index to the sampled table) and C1=48 (the next index after C0 in the table). Let (R0, G0, B0) represent the RGB triplet stored in the sampled lookup table at the cell corresponding to the index (C0, M0, Y0, K0). In general, whenever (Ci, Mi, Yi, Ki) is an input quadruplet for the sampled table, let f(Ci, Mi, Yi, Ki) denote the RGB triplet stored in cell (Ci, Mi, Yi, Ki) of the sampled table. Notice that, given the latter notational convention we can express (R0, G0, B0) as (R0, G0, B0)=f(C0, M0, Y0, K0).

The preceding notational system allows description of the parallelepiped (really hyper-parallelepiped, because it is four dimensional) containing the point (CMYK). This hyper-parallelepiped has sixteen vertices:

(C0,M0,Y0,K0), (C1,M0,Y0,K0), (C0,M1,Y0,K0), (C0,M0,Y1,K0), (C0,M0,Y0,K1), (C1,M1,Y0,K0), (C1,M0,Y1,K0), (C1,M0,Y0,K1), (C0,M1,Y1,K0), (C0,M1,Y0,K1), (C0,M0,Y1,K1), (C0,M1,Y1,K1), (C1,M0,Y1,K1), (C1,M1,Y0,K1), (C1,M1,Y1,K0), (C1,M1,Y1,K1).

The sampled table contains RGB triplets, f(C0,M0,Y0,K0), at all sixteen of these vertices. Under most lookup-plus-interpolation schemes:

(R,G,B)=(R0, G0, B0)+(RD, GD, BD)

where (RD, GD, BD)=some algorithmically calculated function of (C,M,Y,K) and of the RGB triplets at the sixteen vertex points; i.e., the sixteen RGB triplets f(C0,M0,Y0,K0), f(C1,M0,Y0,K0), f(C0,M1,Y0,K0), f(C0,M0,Y1,K0), f(C0,M0,Y0,K1), f(C1,M1,Y0,K0), f(C1,M0,Y1,K0), f(C1,M0,Y0,K1), f(C0,M1,Y1,K0), f(C0,M1,Y0,K1), f(C0,M0,Y1,K1), f(C0,M1,Y1,K1), f(C1,M0,Y1,K1), f(C1,M1,Y0,K1), f(C1,M1,Y1,K0), f(C1,M1,Y1,K1). The 'D' in (RD, GD, BD) denotes 'Delta', in the sense that these three values are deltas from the (R0, G0, B0) values to the actual (R, G, B) values.

It is appropriate to call such a scheme an interpolation scheme because the sixteen vertices are the vertices of the hyper-parallelepiped segment of the base lookup table which envelops the actual (C,M,Y,K) input value, therefore the desired value is within the region of the hyper-parallelepiped. In actual implementations, the value of (RD,GD,BD) is influenced by the values of each vertex to the extent that the point is near that vertex.

Various specific interpolation algorithms exist in the prior art. James M. Kasson et al. in their article "A tetrahedral interpolation technique for color space conversion," describe six classes of interpolation, which they characterize as (1) Tetrahedral Interpolation, (2) Trilinear (or Multilinear) interpolation, (3) Kanamori interpolation, (4) Clark interpolation, and (5) Diphenoid interpolation. Tetrahedral interpolation is described by T. Sakamoto in his U.S. Pat. No. 4,275,413. Kanamori interpolation is described by Kanamori and Kotera in their article "Color Correction Technique for Hard Copies by 4-Neighbors Interpolation Method," cited above. Clark interpolation is described by Clark et al. in U.S. Pat. No. 4,477,833. These references are all expressly incorporated by reference for all purposes.

A common drawback to all these conventional lookup-plus-interpolation methods is that they add an algorithmic component to the lookup component, and can be subject to speed penalties similar to the original purely algorithmic methods such as those of Neugebauer and Viggiano, described above. Some systems can provide for specialized hardware to improve the speed performance of algorithmic calculations. Requiring specialized hardware limits the number of systems such a process could be applicable to.

To summarize, in a system using conventional lookup-plus-interpolation, two steps are carried out:

Step 1: Table Lookup, to get the Base Values, R0, G0, B0.

Step 2: Algorithmic Computation, to calculate the delta values, RD, GD, BD.

Step 2 can be slow, and hence can negate many of the original benefits obtained by using table lookup methods instead of algorithmic methods.

Kanamori, Kawakami and Kotera recognized that the algorithmic computation in step 2 could be slow. U.S. Pat. No. 5,241,373 described techniques for making algorithmic interpolation faster. However, these techniques still do algorithmic interpolation as they still perform multiplicative operations in order to calculate the delta values RD, GD and BD. The speed at which the final result is determined is improved.

SUMMARY OF THE INVENTION

The present invention provides apparatus and method for simply, efficiently and economically converting a color in one color space to a color in another color space. The present invention uses a two-stage table lookup based upon a simplification of prior art systems in order to transform colors from one color space to another in a speed efficient manner.

The preferred embodiment of the present invention includes a sampled lookup table for producing a nominal transformed color from a color to be transformed. The nominal transformed color is created by indexing the sampled lookup table using a preselected number of the most-significant bits of binary representations of color component values representing the color to be transformed. The preselected bits are grouped together to form an index into the sampled lookup table. The preferred embodiment includes a second lookup table, the delta lookup table. The delta lookup table produces a delta value to be combined with the nominal transformed color generate the final transformed color. A delta table index is formed from preselected bits of the binary representations of the color to be transformed.

The preselected bits include a number of most-significant bits and least-significant bits, but less than all of the bits, of the binary representations of the color component values of the color to be transformed. Choosing less than all of the bits reduces the size of the delta lookup table by forcing the condition that all delta values in a particular region, the region identified by the choice of the preselected most-significant bits, are constant for a given group of the least-significant bits chosen for the delta table index. It is well known in the prior art that this condition does not produce strictly accurate transforms as most mathematical models for transforming from one color space to another do not meet this condition. However, by enforcing this condition upon judicious selection of the applicable regions, transformations from one color space to another can be performed in real-time without prohibitive memory requirements. It is further advantageous in that the results obtained are qualitatively very good producing acceptable results. The results are acceptable because the human eye does not discriminate very well between similar colors.

It is another preferred embodiment of the present invention to include a restriction on the magnitude of the delta values obtained from the delta lookup table. The restriction in the preferred embodiment ensures that there is no underflow when combining the delta value and the nominal RGB value. In other embodiments, restriction may be necessary to prevent overflowing.

Reference to the remaining portions of the specification, including the drawing and claims, will realize other features and advantages of the present invention. Further features and advantages of the present invention, as well as the structure and operation of various embodiments of the present invention, are described in detail below with respect to the accompanying drawing. In the drawing, like reference numbers indicate identical or functionally similar elements.

DESCRIPTION OF THE PREFERRED EMBODIMENTS

Figure 1:
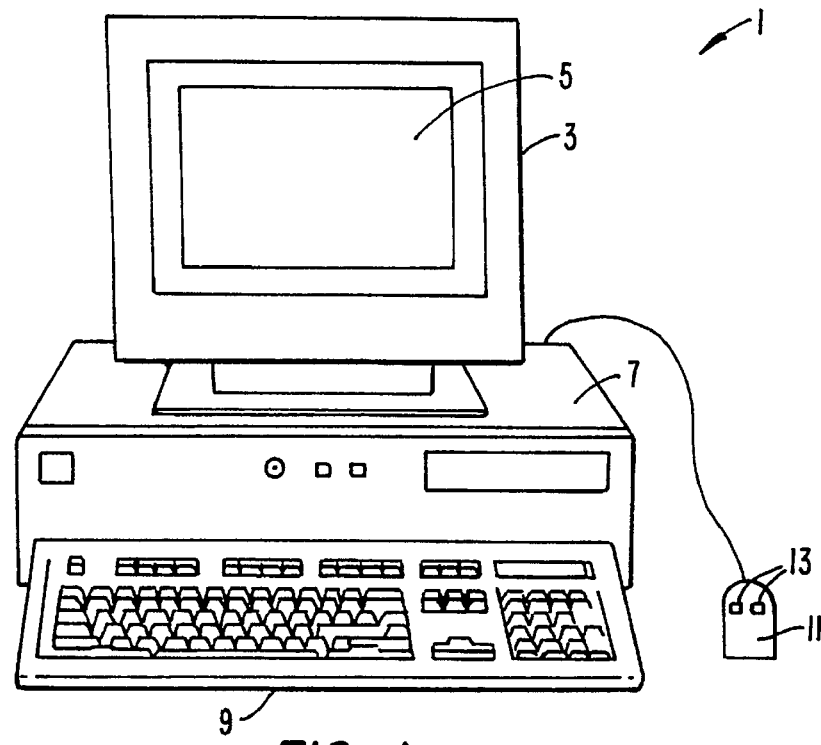
FIG. 1 is an illustration of computer hardware suitable for implementing the present invention.

FIG. 1 is an illustration of computer hardware suitable for implementing the present invention. FIG. 1 shows computer system 1 including monitor 3, display screen 5, housing 7, keyboard 9 and mouse 11. Mouse 11 may have one or more mouse buttons, such as buttons 13. Housing 7 encloses typical computer components such as a processor, memory, disk drives and peripheral interface adapter (not shown).

FIG. 1 represents but one type of computer system suitable for embodying the present invention. Other types of computer systems suitable for use in the present invention include so-called "notebook," "palmtop" or "hand-held," "pentop," etc., computers. Further, the use of the term "mouse" or "user input device" is understood to include relative and absolute pointing devices, as well as other means for inputting information into a computer such as a touch screen, trackball, MIDI keyboard, light pen, data glove, etc. It will be readily apparent to one of ordinary skill in the art that many types of computer hardware, and configurations of the hardware, are suitable for use in conjunction with the present invention.

Figure 2:
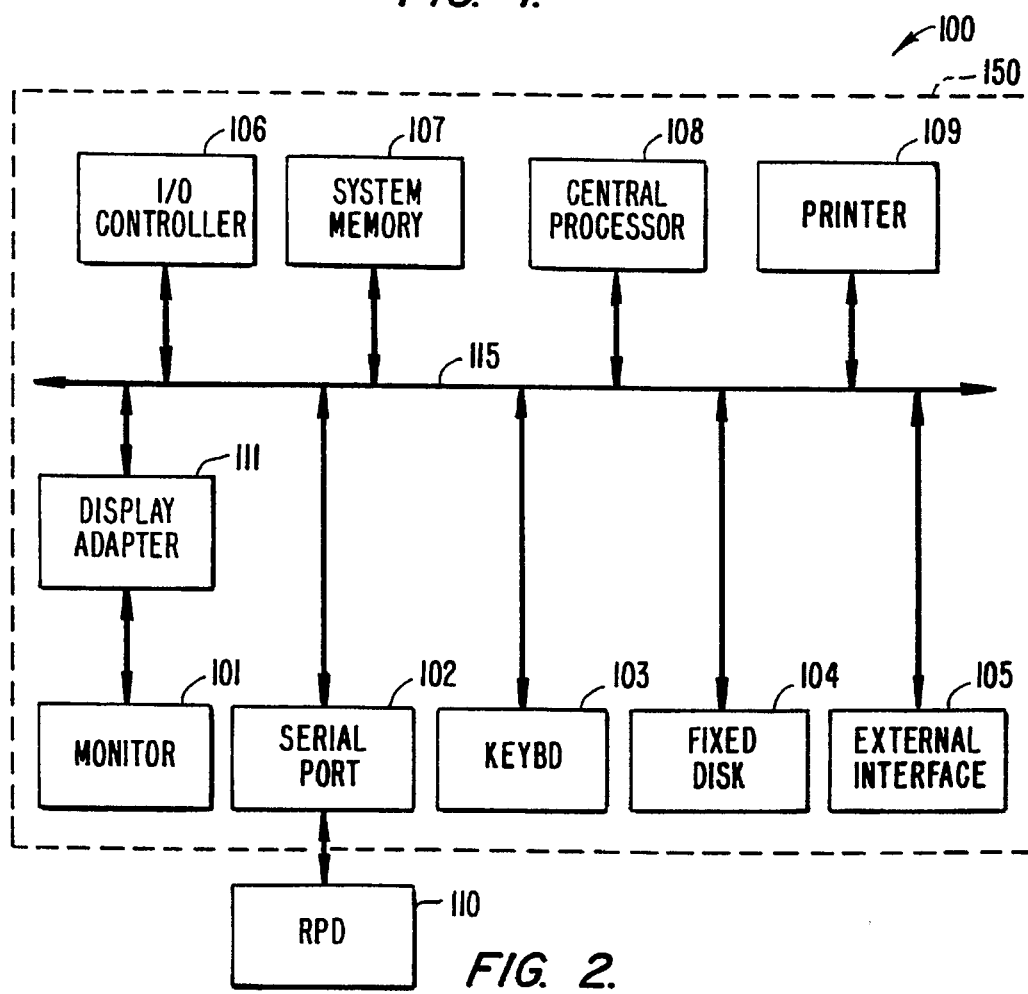
FIG. 2 is a color space transformation system 100 for implementing color space transformation using the computer system 1.

FIG. 2 is a color space transformation system 100 for implementing color-space transformation using the computer system 1. Color space transformation system 100 includes a computer system 150 coupled to a relative-pointing device (RPD) 110, for example a trackball or a mouse. The computer system 150 includes a central processor 108, a system memory 107, an input device, for example a keyboard 103, a fixed disk 104, a monitor 101, an external interface 105, a printer 109, an input/output (I/O) controller 106, a communications port 102, and a display adapter 111. A system bus 115 connects the components of the computer system 150, providing a link among them. The keyboard 103 and RPD 110, taken individually or jointly, are data entry devices with which a user of the computer system 150 can interact with the color-space transformation system 100.

A preferred embodiment uses an appropriately programmed workstation marketed by Sun MicroSystems known as a SparcStation using a UNIX-compatible operating system known as SUN-OS. It is to be understood that other platforms are available and may embody the invention in other forms. The invention is not limited to embodiments that include workstations, but may include other platforms, such as Apple Macintosh® computers (Apple Computer, Cupertino, Calif.) or IBM-compatible PCs, for example. The flowchart of FIG. 3 is implemented by the central processor 108 under appropriate process control and instruction from procedures stored in the system memory 107 and provided as a part of color transformation system 100.

Figure 3:
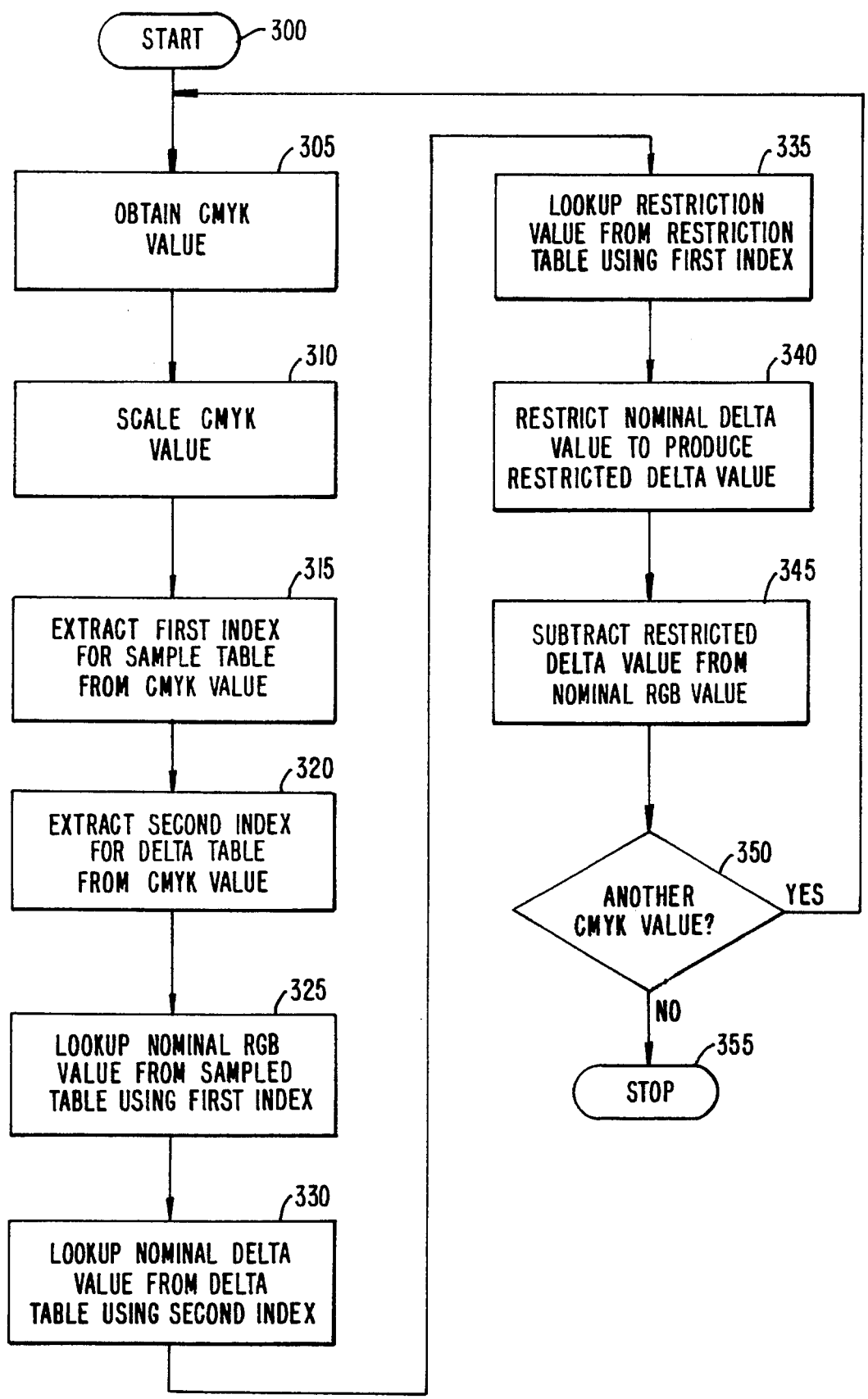
FIG. 3 is a flowchart of steps 300–355 executed by a preferred embodiment of color transformation system 100 when converting one or more colors in a CMYK color space to corresponding colors in an RGB color space.

FIG. 3 is a flowchart of steps 300–355 executed by a preferred embodiment of color transformation system 100 when converting one or more colors in a CMYK color space to corresponding colors in an RGB color space. Color transformation system 100 starts at step 300 and advances to step 305. At step 305, color transformation system 100 obtains CMYK values (one each of cyan, magenta, yellow and black) for a color to be transformed. For the purposes of the following description, the selected values for CMYK correspond to (68, 108, 148, 188).

After obtaining the CMYK values at step 305, color transform system 100 advances to step 310 to scale the CMYK values in the range of 0–255. In the preferred embodiment, CMYK colors are represented by values of 28–228, with 28 representing a 0% dot of the applicable color and 228 representing a 100% dot of the applicable color. By representing colors using this scale, other information related to the particular dot can be included by values less than 28 and values greater than 228. Such information and the particulars regarding implementation of the scaling system are beyond the scope of the present invention and will not be further described herein. Due to the internal representation of the CMYK values, the component values are converted from the 28–228 range to the 0–255 range. In the preferred embodiment, color transform system 100 represents CMYK component values in the 0–255 range by eight bit bytes. Hence, the CMYK values (68, 108, 148, 188) scale to (51, 102, 153, 204).

After scaling the CMYK values at step 310, color transform system 100 advances to step 315 to extract a preselected number of desired most-significant bits from each of the scaled CMYK values. The extracted bits will be the index into the sampled lookup table. The number of bits selected from each component color value does not have to be the same. In the preferred embodiment, color transform system 100 selects four bits from each of the most-significant bits of the CMY components, while color transform system 100 selects five bits of the K component. The selected bits are (C0, M0, Y0, K0), representing the sampled lookup table index.

Binary representations of the scaled CMYK component values are: 51=00110011, 102=01100110, 153=10011001, and 204=11001100. Thus, C0=0011, M0=0110, Y0=1001 while K0=11001. The choice of how many most-significant bits of each of the component color values to select depends upon the desired implementation of the sampled lookup table. For example, the human eye is more sensitive to black than to the other colors, hence more bits are selected for the black than for the other colors. In the present example, (C0, M0, Y0, K0)=(3, 6, 9, 25). In some embodiments, these values will not be the interval number, but represent the actual value. For example, rather than representing the C0 interval as the third interval, it could be represented as 48, the value corresponding to the third interval. Similarly, M0 would be 96 and Y0 would be 144, corresponding to the sixth and ninth intervals, respectively. K0 would be 200, representing the twenty-fifth interval. Note that the interval size for black is smaller because more bits were selected.

After extracting the preselected number of desired most-significant bits at step 315, color transform system 100 advances to step 320 to form a delta index into a delta lookup table from the nominal delta index values of the various component values. The nominal delta index values are the unselected least-significant bits of the CMYK values not used in (C0, M0, Y0, K0). Therefore, the nominal delta index values for the various components are: $\delta C$=(0011) or "3", $\delta M$=(0110) or "6", $\delta Y$=(1001) or "9" and $\delta K$=(100) or "4".

The delta lookup tables stores interpolation values used to adjust nominal transformed colors obtained from the sampled lookup table to create the final transformed color. Color transform system 100 extracts a preselected number of desired most-significant bits from each of the C0M0Y0K0 and the nominal delta values to form the delta index. Again, the preselected number of each of the bits of the various components does not have to be the same.

In the preferred embodiment to form the individual delta index values, color transform system 100 selects one most-significant bit from C0, M0, and Y0, and selects two most-significant bits from K0. From the nominal delta values, color transform system 100 selects four most-significant bits from $\delta C$ and $\delta M$, two most-significant bits from $\delta Y$, and three most-significant bits from $\delta K$.

Note that two least-significant bits are discarded from $\delta Y$ when creating the delta index. As the human is fairly sensitive to variations in black, the human eye is not particularly sensitive to the variations in yellow caused by the discarded bits. Discarding these bits decreases the size of the delta lookup table even further. In some embodiments, color transform system 100 will not discard the least-significant bits of $\delta Y$.

Therefore, those delta index values for each of the scaled CMYK color component values that color transform system 100 creates are: $\Delta C$=(00011), $\Delta M$=(00110), $\Delta Y$=(110), and $\Delta K$=(11100). The delta index is therefore: ($\Delta C$, $\Delta M$, $\Delta Y$, $\Delta K$)=(00011, 00110, 110, 11100).

After creating the delta index values at step 320, color transform system 100 advances to step 325 to lookup a nominal RGB value corresponding to the scaled CMYK value. At step 325, color transform system 100 uses C0M0Y0K0 as the index into the sampled lookup table. In the preferred embodiment, the index C0M0Y0K0 produces a nominal RGB value of (68, 47, 41), again, all the values of which color transform system 100 represents by an eight bit value.

After obtaining the nominal RGB value at step 325, color transform system 100 advances to step 330 to produce a delta value to combine with the nominal RGB value to produce the transform RGB representing the scaled CMYK value. At step 330, color transform system 100 uses ($\Delta C$, $\Delta M$, $\Delta Y$, $\Delta K$) to obtain a delta RGB value to combine with the nominal RGB value. In the preferred embodiment, the delta index ($\Delta C$, $\Delta M$, $\Delta Y$, $\Delta K$) produces a delta RGB value of (4, 5, 5), again, all the values of which color transform system 100 represents by an eight bit value.

After obtaining the nominal RGB values at step 330, color transform system 100 advances to step 335 to produce a restriction RGB delta value. In the preferred embodiment, when transforming CMYK to RGB values, there is a generally inverse relationship between CMYK values and RGB values. Therefore, to combine the nominal RGB value and the delta RGB value, color transform system 100 subtracts the delta RGB value from the nominal RGB value.

However, since a simplifying condition was imposed upon the RGB delta values to reduce the size of the delta lookup table, it is possible that one of the components of the RGB delta values could exceed the value of the nominal RGB value. Color transform system 100 would underflow when subtracting, possibly introducing a large error in the transformed color. Therefore, the delta RGB values are restricted to prevent underflowing, and overflowing in alternate embodiments, when combining the nominal RGB values and the delta RGB values.

In the preferred embodiment, color transform system 100 sets up a restriction table of the same size as the sampled lookup table. Color transform system 100 indexes the restriction table using (C0M0Y0K0) to obtain a restriction value. Color transform system 100 determines the restriction value from the value of the nominal RGB value indexed by the same (C0M0Y0K0) index. The restriction value is the largest number of the form $2^n-1$, n being an integer, that is less than or equal to the corresponding nominal component value. In other words, if the nominal R value indexed by (C0M0Y0K0) were equal to 15, then the restriction value would be 15. Similarly, if the nominal R value were 16–30, the restriction value would still be 15. For the example herein, the restriction values are (63, 31, 31).

After obtaining the restriction values at step 335, color transform system 100 advances to step 340 to restrict the nominal RGB delta values. To produce the restriction delta values, color transform system 100 does a bit-wise logical product ("AND") operation of the restriction values and the nominal RGB delta values. Thus, in the present example, the restricted RGB delta values are (4, 5, 5).

After producing the restricted RGB delta values at step 340, color transform system 100 advances to step 345 to produce the transformed color. At step 345, color transform system 100 subtracts the restricted RGB delta values from the nominal RGB values. The result is the representation of the scaled CMYK value in the RGB color space. In the present example, the RGB values (64, 42, 36) represent the scaled CMYK value, as well as the original CMYK color.

After subtracting the restricted RGB delta values from the nominal RGB values at step 345, color transform system 100 advances to step 350 to test whether there are any other CMYK colors to transform. When the test at step 350 is true (i.e., there are other CMYK values to transform), color transform system 100 returns to step 305 to process the next color. Thereafter, color transform system 100 continues to cycle through step 305 through step 350 until there are no additional CMYK colors to transform. When the test at step 350 is false (i.e., all the CMYK colors have been transformed), color transform system 100 advances to step 355, STOP, to complete the transformation process.

As described above, color transform system 100 in the preferred uses three lookup tables, a sampled lookup table, a delta lookup table and a restriction table. The total sizes of the tables are: sampled lookup table using seventeen-bit index storing three bytes (one for each of RGB)=$2^{17}$*3 or 393210 bytes, restriction table is the same size (393210 bytes), and the delta lookup table uses an eighteen-bit index storing three bytes (one byte for each δ value)=$2^{18}$*3 or 786,432 bytes. The total required memory is much less than required for a full table lookup, yet the present invention advantageously avoids any processing intensive algorithmic calculations, enabling real-time applicability. The total size of all the lookup tables used in the preferred embodiment is much smaller than the excessively large size required by a full table lookup.

The present invention does not depend upon any particular manner of filling the sampled lookup table or the delta lookup table. The present invention will work no matter the method of determining the values in these tables, whether the method be intensive algorithmic calculation, empirical experimentation, or some other method. In the preferred embodiment, the color transform system assumes that the transformation function is monotonic and reasonably continuous. This means that the same transformation method and apparatus disclosed herein can be used with tables generated from very different sources using very different schemes, based on theoretical calculations or empirical measurements, or some combination.

In the remaining portions of the specification, details regarding the preferred embodiment as implemented in the source code provided in Appendix A are provided. The source code provided is written in the C language and designed to be compiled into object code using a SunPro SPARCompiler C2.0 compiler distributed by SunPro (a Sun MicroSystems, Inc. business). The object code produced is executable on a Sun MicroSystems SparcStation.

The following part of the description explains in detail how the color conversion process shown in Appendix A is implemented. The following description discusses the parts of the preferred process at two levels: a conceptual level, and an implementation level. It explains various design options and why the design decisions were made as they were. The following description only includes CMYK to RGB conversion process, since the RGB to CMYK process is very similar, and can be understood once the CMYK to RGB process is understood.

As described above, this process is based on table lookup. Therefore, any transform function may be used to generate the actual table values. The methods used to calculate the main translation table are not further described. The process of determining the table is normally done off-line, so it does not affect the performance of the algorithm.

The preferred implementation of the color conversion system is found in the vr library file src/vr_color_convert.c. As described above, the preferred embodiment uses a smaller table for the base table than the 'perfect' base table (i.e., a sampled lookup table), that contains exact translations for some CMYK combinations, but not others. All components processed by the system are 8 bit unsigned binary numbers.

Instead of indexing by all 8 bits of each component, some number of the most-significant bits of each component are used to construct the index to this table. The number of bits used from each component are defined by the constants CHIBITS, MHIBITS, YHIBITS and KHIBITS. For the current version, CHIBITS, MHIBITS and YHIBITS are each 4, and KHIBITS is 5. This means that a total of 17 bits is used to index into the base translation table, so it has 131072 entries. Each entry is a four byte RGB pixel, with the components in the standard Sun order, or XBGR. The table size is 131072*4, or 524288 bytes. In the code, the table is called RGB. For CMYK values where the unused bits are zero, this translation is exact. That is, for any CMYK value where the low 4 bits of C, M and Y, and the low 3 bits of K are zero, the exact RGB translation of that CMYK value is in the table.

For CMYK values whose unused bits are not zero, the translation is only approximate. For many applications, this approximate translation would suffice. However, there are applications where image fidelity is very important. Especially in regions of vignettes, or slowly changing colors, very visible banding occurs if this method was used alone. For this reason, the RGB values found in the table of the preferred embodiment are modified by a delta value stored in a second table.

As noted above, the preferred implementation discards several of the least-significant bits of C0, M0, Y0 and K0 (variables wherein a preselected number of least-significant bits of input values C, M, Y, and K have been set to zero), and also discards 2 least-significant bits of dY. In the code, the number of most-significant bits of C0 that are retained is called CEXBITS, and is equal to 1. Similarly, MEXBITS is 1, YEXBITS is 1, and KEXBITS is 2. Thus, a total of only 5 bits chosen from the most-significant bits of C0, M0, Y0 and K0 are kept. The number of most-significant bits of dC which are used is CLOBITS, which is equal to 4. This uses all bits in dC. Similarly, MLOBITS is 4, using all bits in dM. YLOBITS is 2, which discards the 2 least-significant bits of dY. (This means that the two least-significant bits of the original Y component are not used at all in the translation.) KLOBITS is 3, which uses all bits in dK. Thus the total number of bits used to index the delta table is 18, providing the table with 262144 entries, and the size of the table is 262144*4=1048576 bytes. The delta table is called RGBD in the code.

As the preferred implementation discards some least-significant bits from the parameters used to find dR, dG and dB, the values obtained are again only approximate. Typically this approximation is not a problem. Visually, the translation produced is quite satisfactory. However, at locations in the RGB color space where the R, G or B values are small, subtracting approximate dR, dG or dB values sometimes underflows the result.

To restrict the values of dR, dG and dB to values that will not underflow the R, G and B values, the preferred implementation uses a restriction table. The restriction table is indexed exactly the same as the base translation table, using the same bits in C0, M0, Y0 and K0. The values in the table are of the form of $2^N-1$, and each entry is the largest number of this form which is less than or equal to the corresponding component value in the base translation table. Call these restriction values rR, rG and rB. These restriction values are bit-anded with dR, dG or dB, as appropriate. This has the effect of decreasing the value of dR, dG or dB to avoid underflow when they are subtracted from the corresponding R, G or B values. The restriction table is called RGBDR in the code, and is always the same size as the base translation table, in this case 524288 bytes.

In addition to the calculations described above, the representation of the component values in other parts of the system scales the input C, M, Y and K values so that the value 28 corresponds to 0 dot, and the value 228 corresponds to 100% dot. The C, M, Y and K values expected by the algorithm, however, are scaled so that the value 0 corresponds to 0 dot, and the value 255 corresponds to 100% dot. Thus, the preferred embodiment rescales the initial C, M, Y and K values from the 28–228 scaling to the 0–255 scaling.

The following are the conceptual steps carried out by the color conversion process:

1. Convert initial C, M, Y and K values from 28–228 scaling to 0–255 scaling. Call these values C', M', Y' and K'.
2. Extract the bits from C', M', Y' and K' used to index the base table, and form an index value from the bits. Call this index I.
3. Extract the bits from C', M', Y' and K' used to index the delta table, and form an index value from the bits. Call this index J.
4. Index the base table using I, producing R0, G0 and B0.
5. Index the delta table using J, producing dR, dG and dB.
6. Index the restriction table using I, producing rR, rG and rB.
7. Form the restricted deltas using a bit-and operation:

dR'=dR&rR, dG'=dG&rG, dB'=dB&rB

8. Form the final RGB components by subtracting the restricted deltas from the base translation values:

R=R0–dR', G=G0–dG', B=B0–dB'

The actual implementation of the above process listed in the Appendix includes several details left out of the discussion above. The most often called procedure of the code in the Appendix is vr_cmyk228_xbgr(). The vr_cmyk228_xbgr() procedure begins on line 1175 of vr_color_convert.c. The additional details are explained using this procedure as an example. The procedure begins thus:

```
int
vr_cmyk228_xbgr(VrAccess *dstasp, VrAccess *srcasp)
{
    register unsigned long LastCMYK;
    unsigned long LastRGB;
    register int w;
    register unsigned char *a,*a2;
    int h; unsigned char *aa, *aa2;
```

Several local variables are declared. They are:

| | |
|---|---|
| LastCMYK | the CMYK value of the previously translated pixel |
| LastRGB | the RGB value of the previously translated pixel |
| w | a loop counter for moving through the pixel buffers horizontally |
| h | a loop counter for moving through the pixel buffers vertically |
| aa | pointer to the source pixel in the outer loop |
| aa2 | pointer to the destination pixel in the outer loop |
| a | pointer to the source pixel in the inner loop |
| a2 | pointer to the destination pixel in the inner loop |

More code:

```
if (!vr_inited) VR_RETURN_ERR_ERR(VR_ERR_NOT_INITED);
if ((dstasp->PixelType !=VR_PIXELTYPE_xBGR) ||(scrasp->
PixelType!=
VR_PIXELTYPE_CMYK228)) VR_RETURN_DIAG_VAL(1);
if(dstasp->SolidOk)
{
    if(srcasp->bufs[0].xinc || scrasp->bufs[0].yinc)
        dstasp->SolidOk = 0;
    else dstasp->bufs[0].xinc = dstasp->bufs[0].yinc = 0;
}
```

Here, the color conversion process checks for the correct pixel types of the arguments, and handles libvr solid buffer bookkeeping. The code continues:

```
if(RGB)
{
    /*
    *XXX:MAB 10/30/91 Note: this chunk of code has been highly optimized
    *for the SPARC architecture. Be careful if you change it. ECR tends to
    *spend A LOT of time here ...
    */
    register unsigned long I,J;
    register insigned long *YKhiIndP = YKhiInd;
    register unsigned long *YKloIndP = YKloInd;
    register unsigned short *CMhiIndP = CMhiInd;
    register unsigned short *CMloIndP = CMloInd;
    register unsigned char *RGBP = (unsigned char *)RGB;
    register unsigned char *RGBDRP = (unsigned char *)RGBDR;
    register unsigned long *RGBDP = RGBD;
```

The if() statement checks to see if lookup tables should be used for the color translation. If RGB is null, the default translation is done further down in the code. Otherwise, it begins to do the table translation. The comment notes that the code was designed to work well on a Sun SPARC architecture, and may not be optimal for other computer types. The local variables defined here are all register variables, since this code must run extremely quickly. The variables are:

| | |
|---|---|
| I | the base table and restriction table index |
| J | the delta table index |
| CMhiIndP | pointer to table used to extract I index bits from C and M |
| CMloIndP | pointer to table used to extract J index bits from C and M |
| YKhiIndP | pointer to table used to extract I index bits from Y and K |
| YKloIndP | pointer to table used to J index bits from Y and K |
| RGBP | pointer to base translation table |
| RGBDP | pointer to delta translation table |
| RGBDRP | pointer to restriction table |

The code continues:

```
/* lookup table version with interpolation */
/* XXX: MAB Machine Dependent !!! */
aa = scrasp->bufs[0].Data;
aa2 = dstasp->bufs[0].Data;
```

-continued

```
/* check for byte alignment . . . */
if(((int)aa&3 || ((int)srcasp->bufs[0 .xinc&3) || ((int)srcasp->bufs[0]
.yinc&3)
      || ((int)aa2&3)||(int)dstasp->bufs[0].xinc&3 || ((int)dstasp->bufs[0]
.yinc&3))
     return(1);
LastCMYK =~*(unsigned long *)aa;
LastRGB = 0;
h = dstasp->SolidOk?!1:srcasp->ah;
```

The outer loop source and destination pixel pointers are initialized from the pixel buffer arguments. A check is made to be sure that the pixels in both buffers are all 4-byte aligned in memory, since the algorithm accesses them as longwords. If they are not aligned, the procedure returns "1", which is an indication to the caller that the translation was not done, and a more generic translation routine should be called. The value of the "previously" translated pixel, LastCMYK, is initialized to a value that is not equal to the first pixel, which guarantees that the first pixel will be translated. The value of LastRGB is set to 0, although this is not really necessary. The outer loop counter, h, is initialized from the height of the source pixel buffer. The code continues:

```
while(h > 0)
{
   a=aa;
   a2=aa2;
   w=dstasp->SolidOk?!1:srcasp->aw;
   while(w > 0)
   }
```

The first while() loop ranges over rows of pixels in the buffers. Inside this outside loop, the values of the source and destination pixel pointers for the inner loop, a and a2, are initialized. The inside loop counter, w, is also initialized from the width of the source pixel buffer. The second while() loop ranges over pixels in a single row of the pixel buffer. The code continues:

```
if(*(unsigned long *)a == LastCMYK)
      *(unsigned long *)a2 = LastRGB;
else
{
```

If the current source pixel is equal to the previously translated source pixel, the previously calculated destination pixel value is written to the current destination pixel. This is an optimization that improves performance for regions of constant color. If the source pixel is not equal to the previous source pixel, the else clause is executed:

```
(1) Last CMYK = *(unsigned long *)a;
(2) I = (YKhiIndP[LastCMYK&0xFFFF] +
      CMhiIndP[LastCMYK>>16]<<2;
(3) J = YKloIndP[LastCMYK&0xFFFF] +
      CMloIndP[LastCMYK>>16]];
(4) *(unsigned long *)a2 = LastRGB =
(5)    (*(unsigned long *)(RGPB+I))
(6)       -((*(unsigned long *)(RGBDRP+I))&RGBDP[J]);
```

These lines, (1)–(6) are where the conceptual steps, 1 through 8 above, are implemented. This is the most complex part of the code, and should be studied very carefully. This section of code will be discussed one line at a time, since it is so complex.

Line (1):

The first line sets the saved value of the translated source pixel.

Line (2):

I=(YKhiIndP[LastCMYK&0xFFFF]+CMhiIndP[LastCMYK>>16])<<2;

accomplishes steps 1 and 2. The expression LastCMYK&0xFFFF masks off the Y and K components of the pixel, producing a 16 bit value containing the 8 Y and 8 K bits. This value is used as an index into the YKhiIndP table. This table has been calculated to do two things:

1. translate the input Y and K components from 28–228 scaling to 0–255 scaling.
2. extract and rearrange the bits from the components that are needed in the index I.

The expression LastCMYK>>16 masks off the C and M components of the pixel, producing a 16 bit value containing the 8 C and 8 M bits. This value is used as an index into the CMhiIndP table. This table has also been calculated to do two things:

1. translate the input C and M components from 28–228 scaling to 0–255 scaling
2. extract and rearrange the bits from the components that are needed in the index I.

These two values are then added together. This gives the conceptual I value. This value is shifted right by 2 in the implementation, converting the conceptual table index into an index suitable for use with a character array.

Line (3):

J=YKloIndP[LastCMYK&0xFFFF]+CMloIndP[LastCMYK>>16];

accomplishes steps 1 and 3. The expression LastCMYK&0xFFFF masks off the Y and K components of the pixel, producing a 16 bit value containing the 8 Y and 8 K bits. This value is used as an index into the YKloIndP table. This table has been calculated to do two things:

1. translate the input Y and K components from 28–228 scaling to 0–255 scaling
2. extract and rearrange the bits from the components that are needed in the index J.

The expression LastCMYK>>16 masks off the C and M components of the pixel, producing a 16 bit value containing the 8 C and 8 M bits. This value is used as an index into the CMloIndP table. This table has also been calculated to do two things:

1. translate the input C and M components from 28–228 scaling to 0–255 scaling
2. extract and rearrange the bits from the components that are needed in the index J.

These two values are then added together. This gives the actual J value, since this value is used to index a longword array.

Lines (4), (5) & (6):

```
*(unsigned long *)a2 = LastRGB =
   (*(unsigned long *)(RGBP+I)
      -((*(unsigned long *)(RGBDRP+I))&RGBDP[J]);
```

Here, the final RGB pixel is calculated and stored. These three lines implement conceptual steps 4, 5, 6, 7 and 8 from above.

In line (5), the expression RGBP+I produces a char pointer to the correct location in the base translation table. The expression (unsigned long *)(RGBP+I) therefore produces a longword pointer to that location, and the full expression (*(unsigned long *)(RGBP+I)) gives a longword containing the base R, G and B translation values in the proper positions.

In line 6, the expression RGBDRP+I produces a char pointer to the correct location in the restriction table. The expression (unsigned long *)(RGBDRP+I) therefore produces a longword pointer to that location, and the full expression (*(unsigned long *)(RGBDRP+I)) gives a longword containing the R, G and B restriction values in the proper positions. The expression RGBDP[J] gives a longword with the R, G and B delta values in the proper positions, so the full line:

−((*(unsigned long *) (RGBDRP+I))&RGBDP[J]);

is a longword containing the restricted R, G and B delta values, which are subtracted from the base RGB values calculated in line (5), producing the final RGB pixel as a 4 byte longword. This value is stored into LastRGB and into the destination buffer in line (4).

The rest of the routine increments pointers in the inner and outer loop, and also implements the default color translation:

R=1−C−K

G=1−M−K

B=1−Y−K if no translation table is being used.

In conclusion, the present invention provides a simple, efficient solution to a problem of transforming a color in one color space to its equivalent representation in another color space for real-time applications, without requiring multiplicative operations or excessively large lookup tables. While the above is a complete description of the preferred embodiments of the invention, various alternatives, modifications, and equivalents may be used. Therefore, the above description should not be taken as limiting the scope of the invention which is defined by the appended claims.

**TABLE-BASED LINEAR INTERPOLATION
FOR COLOR CORRECTION SYSTEM AND METHOD
Inventor: Mark Boenke**

APPENDIX A

```
/*
FilePrefaceBegin:C:1.0
|************************************************************
| (C) Copyright 1992 Island Graphics Corporation.  All Rights Reserved.
|
| Title: vr_color_convert.c
|
| Abstract: convert from one color to another
|
| Notes:
|
| $Id: vr_color_convert.c,v 1.14 1994/02/22 17:15:56 mark Exp $
|
| Log:
| 93/03/25 Mark Boenke remove non-colorspace change pixel conversions
| 93/03/24 Mark Boenke fix rgb->cmyk errors
| 93/03/19 Mark Boenke lose unused vars
| 93/03/04 Mark Boenke fix build of RGBD table
| 93/02/05 Mark Boenke lose global symbols
| 93/02/05 Mark Boenke bits_ => vr_bits_
| 93/01/07 Mark Boenke read libacc format files
| 92/12/03 Mark Boenke CMYK optimizations
| 92/12/01 Mark Boenke CMYK228 optimizations
| 92/11/13 Mark Boenke fix some more color conversions (vr_cmyk_rgb())
| 92/11/05 Mark Boenke fix some color conversions
| 92/08/19 Mark Boenke              Created from ECR ymck.c stuff
|************************************************************
| FilePrefaceEnd
*/

/*lint -e??? XXX: don't bother yet... */

/*************************** Includes ***************************/ include <string.h>
include <stdio.h>
#include <fcntl.h>
#include <math.h>
#include <stdlib.h>
#include <unistd.h>
```

TABLE-BASED LINEAR INTERPOLATION FOR COLOR CORRECTION SYSTEM AND METHOD- BOENKE PAGE 2

```
#include <string.h>
#include "libidf.h"
#include "libvr.h"
#include "vr_internal.h"
```

/************************* Defines ****************************/

```
#define DEFAULT_ZERO        0
#define DEFAULT_HUNDRED     255
#define DS_ZERO             28
#define DS_HUNDRED          228

/* color component size parameters */
#define MAXCCOMP 255
#define CSIZE               256                 /* == MAXCCOMP + 1 */
#define CSHIFT              8                   /* == log2(CSIZE) */
#define FSIZE               (CSIZE*CSIZE)       /* size of 2 parameter lookup table */
#define SSIZE               (sizeof(unsigned short))
#define LSIZE               (sizeof(unsigned long))
#define LFSIZE              (LSIZE*FSIZE)
#define SFSIZE              (SSIZE*FSIZE)
#define LCSIZE              (LSIZE*CSIZE)

#defineRedMask                      0x000000ff
#defineGreenMask             0x0000ff00
#defineBlueMask              0x00ff0000
#defineVideoMask             0xff000000

/* for XBGR pixels */
#defineRedShift              0
#defineGreenShift            8
#defineBlueShift             16

/* for CMYK pixels */
#define CyanShift            24
#define MagentaShift         16
#define YellowShift          8
#define BlackShift           0
#defineBlackIndex            0
#defineYellowIndex           1
#defineMagentaIndex          2
```

```
#define CyanIndex         3

/* for lookup tables */
#define RedInd            0
#define GreenInd          1
define BlueInd           2 define RedIndex          3
define GreenIndex        2
#define BlueIndex         1
#define VideoIndex        0

/*
 * khibits  5       high bits of K used in main lookup index
 * yhibits  4       high bits of Y used in main lookup index
 * mhibits  4       high bits of M used in main lookup index
 * chibits  4       high bits of C used in main lookup index
 * kexbits  2       high bits of K used in minor interpolation lookup index
 * yexbits  1       high bits of Y used in minor interpolation lookup index
 * mexbits  1       high bits of M used in minor interpolation lookup index
 * cexbits  1       high bits of C used in minor interpolation lookup index
 * klobits  3       bits below high bits used in interp. index
 * ylobits  2       bits below high bits used in interp. index
 * mlobits  4       bits below high bits used in interp. index
 * clobits  4       bits below high bits used in interp. index
 * mchibits 8       = mhibits + chibits
 * cmykhibits       17      = khibits + yhibits + mhibits + chibits
 * cmykexbits       5       = kexbits + yexbits + mexbits + cexbits
 * kexshift 6       = 8 - kexbits
 * yexshift 7       = 8 - yexbits
 * mexshift         7       = 8 - mexbits
 * cexshift 7       = 8 - cexbits
 * cmyklobits       13      = klobits + ylobits + mlobits + clobits
 * kubits   0       = 8 - khibits - klobuts
 * yubits   2       = 8 - yhibits - ylobits
 * mubits   0       = 8 - mhibits - mlobits
 * cubits   0       = 8 - chibits - clobits
 * kloubits 3       = klobits + kubits = 8 - khibits
 * yloubits 4       = ylobits + yubits = 8 - yhibits
```

```
 * mloubits          4          = mlobits + mubits = 8 - mhibits
 * cloubits 4                   = clobits + cubits = 8 - chibits
 * yleobits 3                   = yexbits + ylobits
 * mcleobits         10         = mexbits + mlobits + cexbits + clobits
 * cleobits 5                   = cexbits + clobits
 * cmykaccshift      12         =
kexshift+yexshift+mexshift+cexshift-cmyklobits
 *                              -kubits-yubits-mubits-cubits
 * rhibits  5
 * ghibits  5
 * bhibits  5
 * rgbhibits         15         = rhibits + ghibits + bhibits
 * rexbits  1
 * gexbits  1
 * bexbits  1
 * rgbexbits         3          = rexbits + gexbits + bexbits
 * rexshift 7                   = 8 - rexbits
 * gexshift 7                   = 8 - gexbits
 * bexshift 7                   = 8 - bexbits
 * rlobits  3
 * globits  3
 * blobits  3
 * rgblobits         9          = rlobits + globits + blobits
 * rubits    0                  = 8 - rhibits - rlobits
 * gubits    0                  = 8 - ghibits - globits
 * bubits    0                  = 8 - bhibits - blobits
 * rloubits 3                   = rlobits + rubits = 8 - rhibits
 * gloubits 3                   = globits + gubits = 8 - ghibits
 * bloubits 3                   = blobits + bubits = 8 - bhibits
 * rgbaccshift       12         = rexshift+gexshift+bexshift-rgblobits
 *                              -rubits-gubits-bubits
 */ define KHIBITS              5
define YHIBITS              4
#define MHIBITS              4
#define CHIBITS              4
#define MCHIBITS       8
#define KYMCHIBITS     17
#define KEXBITS              2
#define YEXBITS              1
#define MEXBITS              1
```

TABLE-BASED LINEAR INTERPOLATION FOR COLOR CORRECTION SYSTEM AND METHOD- BOENKE PAGE 5.

```
#define CEXBITS         1
#define KYMCEXBITS      5
#define KEXSHIFT        6
#define YEXSHIFT        7
#define MEXSHIFT        7
#define CEXSHIFT        7
#define KLOBITS         3
#define YLOBITS         2
#define MLOBITS         4
#define CLOBITS         4
#define KYMCLOBITS      13
#define KUBITS          0
#define YUBITS          2
#define MUBITS          0
#define CUBITS          0
#define KLOUBITS        3
#define YLOUBITS        4
#define MLOUBITS        4
#define CLOUBITS        4
#define YLEOBITS        3
#define MCLEOBITS       10
#define CLEOBITS        5
#define KYMCACCSHIFT    12
#define RHIBITS         5
#define GHIBITS         5
#define BHIBITS         5
#define RGBHIBITS       15
#define REXBITS         1
#define GEXBITS         1
#define BEXBITS         1
#define RGBEXBITS       3
#define REXSHIFT        7
#define GEXSHIFT        7
#define BEXSHIFT        7
#define RLOBITS         3
#define GLOBITS         3
#define BLOBITS         3
#define RGBLOBITS       9
#define RUBITS          0
#define GUBITS          0
#define BUBITS          0
```

```
#define RLOUBITS        3
#define GLOUBITS        3
#define BLOUBITS        3
#define RGBACCSHIFT     12
```

/************************* Functions ****************************/

/* Global - see vr_internal.h */

/* Static */

```
static int mktables(void);
static void freetables(void);
static int mkRGBDtables(void);
static int mkCMYKDtables(void);

static int vr_read_comment(Idf idf);
static int vr_read_range(Idf idf);
static int vr_read_rgb_table(Idf idf);
static int vr_read_rgbd_table(Idf idf);
static int vr_read_kymc_table(Idf idf);
static int vr_read_kymcd_table(Idf idf);
```

/************************* Data **********************************/

/* Static */

```
static char map_filename[256];
static unsigned long *RhiInd,*GhiInd,*BhiInd;
static unsigned long *RloInd,*GloInd,*BloInd;
static unsigned long *CMYK,*CMYKD,*CMYKDR;

/* CMYK index lookup tables */
static unsigned short *CMhiInd;
static unsigned long *YKhiInd;
static unsigned short *CMloInd;
static unsigned long *YKloInd;

static unsigned long *RGB,*RGBD,*RGBDR;

static char *comment = 0;
```

```
static int zeroPercent, hundredPercent;

/*************************** Code ********************************/ static int
vr_read_comment(Idf idf)
{
   const char*              string;

string = IdfGetString(idf, 0);
   IDF_RET_IF_ERR(idf);

if(comment) vr_free(comment);
   comment = (char *) vr_malloc(strlen(string)+1);
   if(!comment)
       return(IDF_STOP);

strcpy(comment, string);
   IDF_RET(idf);
} static int
vr_read_range(Idf idf)
{
   zeroPercent = IdfGetInt(idf, 0);
   IDF_RET_IF_ERR(idf);
   hundredPercent = IdfGetInt(idf, 1);
   IDF_RET_IF_ERR(idf);
   IDF_RET(idf);
} static int
vr_read_rgb_table(Idf idf)
{
   int     offset;
   int     length;
   FILE*   file;
   long savedPosition;

file = IdfGetStream(idf);
   if (!file)
```

```
        return(IDF_STOP);

IdfGetBinary(idf, 0, &offset, &length );
    IDF_RET_IF_ERR(idf);
    if (length != LSIZE*(1<<KYMCHIBITS))
        return(IDF_STOP);

RGB = (unsigned long *)vr_malloc(length);
    if(!RGB)
        return(IDF_STOP);
    savedPosition = ftell(file);
    fseek(file, offset, 0);
    fread((char*)RGB, length, 1, file);
    fseek(file, savedPosition, 0);
    IDF_RET(idf);
} static int
vr_read_rgbd_table(Idf idf)
{
    int     offset;
    int     length;
    FILE*   file;
    long savedPosition;

file = IdfGetStream(idf);
    if (!file)
        return(IDF_STOP);

IdfGetBinary(idf, 0, &offset, &length );
    IDF_RET_IF_ERR(idf);
    if (length != LSIZE*(1<<(KYMCEXBITS+KYMCLOBITS)))
        return(IDF_STOP);
    RGBD = (unsigned long *)vr_malloc(length);
    if(!RGBD)
        return(IDF_STOP);

savedPosition = ftell(file);
    fseek(file, offset, 0);
    fread((char*)RGBD, length, 1, file);
    fseek(file, savedPosition, 0);
```

```
    IDF_RET(idf);
} static int
vr_read_kymc_table(Idf idf)
{
    int     offset;
    int     length;
    FILE*   file;
    long savedPosition;
    register unsigned char *d;
    register int i,j;

file = IdfGetStream(idf);
    if (!file)
        return(IDF_STOP);

IdfGetBinary(idf, 0, &offset, &length);
    IDF_RET_IF_ERR(idf);
    if (length != LSIZE*(1<<RGBHIBITS))
        return(IDF_STOP);
    CMYK = (unsigned long *)vr_malloc(length);
    if(!CMYK)
        return(IDF_STOP);

savedPosition = ftell(file);
    fseek(file, offset, 0);
    fread((char*)CMYK, length, 1, file);
    fseek(file, savedPosition, 0);

/* flip bytes (KYMC order change to CMYK) */
    for(d = (unsigned char *)CMYK, i = 0; i < (1<<RGBHIBITS); i++, d += 4)
    {
        j = (int)d[0];
        d[0] = d[3];
        d[3] = (unsigned char)j;
        j = (int)d[1];
        d[1] = d[2];
        d[2] = (unsigned char)j;
    }
```

```
    IDF_RET(idf);
} static int
vr_read_kymcd_table(Idf idf)
{
    int     offset;
    int     length;
    FILE*   file;
    long savedPosition;
    register unsigned char *d;
    register int i,j;

file = IdfGetStream(idf);
    if (!file)
        return(IDF_STOP);

IdfGetBinary(idf, 0, &offset, &length);
    IDF_RET_IF_ERR(idf);
    if (length != LSIZE*(1<<(RGBEXBITS+RGBLOBITS)))
        return(IDF_STOP);
    CMYKD = (unsigned long *)vr_malloc(length);
    if(!CMYKD)
        return(IDF_STOP);

savedPosition = ftell(file);
    fseek(file, offset, 0 );
    fread((char*)CMYKD, length, 1, file);
    fseek(file, savedPosition, 0);

/* flip bytes (KYMC order change to CMYK) */
    for(d = (unsigned char *)CMYKD, i = 0; i < (1<<(RGBEXBITS+RGBLOBITS)); i++, d += 4)
    {
        j = (int)d[0];
        d[0] = d[3];
        d[3] = (unsigned char)j;
        j = (int)d[1];
        d[1] = d[2];
        d[2] = (unsigned char)j;
    }
```

```
    IDF_RET(idf);
}

/*
| ProcedurePrefaceBpegin:C:1.0
|************************************************************
|
| Title:  VrColorInit - CMYK<->RGB translation initialization function.
|
| Abstract: This function initializes the CMYK<->RGB tables
|
| Usage:   VrColorInit(filename);
|
| Parameters:
|
| Returns: Nothing.
|
|************************************************************
| ProcedurePrefaceEnd
*/ int
VrConfigColor(char *filename)
{
    int err;
    Idf     idfh;
    FILE*   file;

if(!(filename && *filename))
    {
        err = VR_ERR_ARG_IS_BAD;
        goto err_ret;
    } strcpy(map_filename,filename);

freetables();

file = fopen(filename, "r");
    if (!file) {
        err = VR_ERR_ARG_IS_BAD;
```

```
        goto err_ret;
}

IdfStartup();
if (IdfCreate(&idfh)) {
    err = VR_ERR_INTERNAL;
    goto err_ret;
}
IdfSetStream(idfh, file);

/* Specify the callback routines needed to parse the file. */
IdfDefineFunc(idfh, "ColorMappingComment", IdfNullCallback,
        vr_read_comment, (void*)0);
IdfDefineFunc(idfh, "PercentRange", IdfNullCallback,
        vr_read_range, (void*)0);
IdfDefineFunc(idfh, "YMCKtoRGB", IdfNullCallback,
        vr_read_rgb_table, (void*)0);
IdfDefineFunc(idfh, "YMCKtoRGBdelta", IdfNullCallback,
        vr_read_rgbd_table, (void*)0);
IdfDefineFunc(idfh, "RGBtoYMCK", IdfNullCallback,
        vr_read_kymc_table, (void*)0);
IdfDefineFunc(idfh, "RGBtoYMCKdelta", IdfNullCallback,
        vr_read_kymcd_table, (void*)0);

IdfSetUFuncHandling(idfh, IDF_SKIP);

zeroPercent = DEFAULT_ZERO;
hundredPercent = DEFAULT_HUNDRED;

IdfParse(idfh);
err = IdfErr(idfh);
IdfDestroy(idfh);
IdfShutdown();

fclose(file);

if(!(RGB&&CMYK))
{
    err = VR_ERR_INTERNAL;
    goto err_ret;
}
```

```
    if(err = mktables()) goto err_ret;
    if(err = mkCMYKDtables()) goto err_ret;
    if(err = mkRGBDtables()) goto err_ret;

return(0);

err_ret:
    freetables();
    return(err);
} int
vr_rgb_get_method()
{
    return(!!RGB);
} static void
freetables()
{
    if(CMhiInd)
    {
        vr_free(CMhiInd);
        CMhiInd = (unsigned short *)0;
    }
    if(CMloInd)
    {
        vr_free(CMloInd);
        CMloInd = (unsigned short *)0;
    }
    if(YKhiInd)
    {
        vr_free(YKhiInd);
        YKhiInd = (unsigned long *)0;
    }
    if(YKloInd)
    {
        vr_free(YKloInd);
        YKloInd = (unsigned long *)0;
```

```
        }
    if(RGB)
    {
        vr_free(RGB);
        RGB = 0;
    }
    if(RGBD)
    {
        vr_free(RGBD);
        RGBD = 0;
    }
    if(RGBDR)
    {
        vr_free(RGBDR);
        RGBDR = 0;
    }
    if(RhiInd)
    {
        vr_free(RhiInd);
        RhiInd = (unsigned long *) 0;
    }
    if(GhiInd)
    {
        vr_free(GhiInd);
        GhiInd = (unsigned long *) 0;
    }
    if(BhiInd)
    {
        vr_free(BhiInd);
        BhiInd = (unsigned long *) 0;
    }
    if(RloInd)
    {
        vr_free(RloInd);
        RloInd = (unsigned long *) 0;
    }
    if(GloInd)
    {
        vr_free(GloInd);
        GloInd = (unsigned long *) 0;
    }
```

```
    if(BloInd)
    {
        vr_free(BloInd);
        BloInd = (unsigned long *) 0;
    }
    if(CMYK)
    {
        vr_free(CMYK);
        CMYK = 0;
    }
    if(CMYKD)
    {
        vr_free(CMYKD);
        CMYKD = 0;
    }
    if(CMYKDR)
    {
        vr_free(CMYKDR);
        CMYKDR = 0;
    }
} static int
mktables()
{
    unsigned char tbuf[256];
    register unsigned char *p;
    register int i;
    double a,b;
    register unsigned long ind;
    unsigned long lk[256],pdi;
    int cy,mk,j;

if(!(CMYK&&RGB)) return(VR_ERR_INTERNAL);

RhiInd = (unsigned long *) vr_malloc(LCSIZE);
    GhiInd = (unsigned long *) vr_malloc(LCSIZE);
    BhiInd = (unsigned long *) vr_malloc(LCSIZE);

RloInd = (unsigned long *) vr_malloc(LCSIZE);
    GloInd = (unsigned long *) vr_malloc(LCSIZE);
```

```
BloInd = (unsigned long *) vr_malloc(LCSIZE);

CMhiInd = (unsigned short *) vr_malloc(SFSIZE);
YKhiInd = (unsigned long *) vr_malloc(LFSIZE);

CMloInd = (unsigned short *) vr_malloc(SFSIZE);
YKloInd = (unsigned long *) vr_malloc(LFSIZE);

CMYKDR = (unsigned long *) vr_malloc(LSIZE*(1<<RGBHIBITS));

RGBDR = (unsigned long *) vr_malloc(LSIZE*(1<<KYMCHIBITS));

if(!(RhiInd&&GhiInd&&BhiInd&&RloInd&&GloInd&&BloInd
     &&CMhiInd&&YKhiInd&&CMloInd&&YKloInd&&RGBDR&&CMYKDR))
    goto err_ret;

if((zeroPercent != DS_ZERO) || (hundredPercent != DS_HUNDRED))
{
    a = (double)(DS_HUNDRED-DS_ZERO)/(double)(hundredPercent-zeroPercent);
    b = DS_ZERO + 0.5;
    for(i = 0; i < 256; i++)
    {
      j = (int)floor((i-zeroPercent)*a+b);
      if(j < 0)
         j = 0;
      else if(j > 255)
         j = 255;
      tbuf[i] = j;
    }

/* convert table to correct 0-100% scaling */
    for(p = (unsigned char *)CMYK, ind = 0; ind < LSIZE*(1<<RGBHIBITS); p++, ind++)
       *p = tbuf[*p];

/* recalculate delta tables */
    if(CMYKD)
    {
      vr_free(CMYKD);
      CMYKD = 0;
    }
```

```
} for(ind = 0; ind < 256; ind++)
{
    for(pdi = 255; pdi > ind; pdi = pdi>>1)
        ;
    lk[ind] = pdi;
}

/* calculate CMYKDR */
for(ind = 0; ind < (1<<RGBHIBITS); ind++)
{
    pdi = lk[((CMYK[ind]>>24)&255)]<<24;
    pdi |= lk[((CMYK[ind]>>16)&255)]<<16;
    pdi |= lk[((CMYK[ind]>>8)&255)]<<8;
    pdi |= lk[CMYK[ind]&255];
    CMYKDR[ind] = pdi;
} for(ind = 0; ind < CSIZE; ind++)
{
    RhiInd[ind] = ((ind>>RLOUBITS)<<(GHIBITS+BHIBITS));
    GhiInd[ind] = ((ind>>GLOUBITS)<<BHIBITS);
    BhiInd[ind] = (ind>>BLOUBITS);
    RloInd[ind] = ((ind>>REXSHIFT)<<(GEXBITS+BEXBITS+RGBLOBITS))
        + (((ind>>RUBITS)&((1<<RLOBITS)-1))<<(GLOBITS+BLOBITS));
    GloInd[ind] = ((ind>>GEXSHIFT)<<(BEXBITS+RGBLOBITS))
        + (((ind>>GUBITS)&((1<<GLOBITS)-1))<<BLOBITS);
    BloInd[ind] = ((ind>>BEXSHIFT)<<RGBLOBITS)
        + ((ind>>BUBITS)&((1<<BLOBITS)-1));
} for(ind = 0; ind < (1<<KYMCHIBITS); ind++)
{
    pdi = lk[((RGB[ind]>>RedShift)&255)]<<RedShift;
    pdi |= lk[((RGB[ind]>>GreenShift)&255)]<<GreenShift;
    pdi |= lk[((RGB[ind]>>BlueShift)&255)]<<BlueShift;
    RGBDR[ind] = pdi;
} if((zeroPercent != DS_ZERO) || (hundredPercent != DS_HUNDRED))
```

```
        {
            a = (double)(hundredPercent-zeroPercent)/(double)(DS_HUNDRED-DS_ZERO);
            b = zeroPercent + 0.5;
            for(i = 0; i < 256; i++)
            {
                j = (int)floor((i-DS_ZERO)*a+b);
                if(j < 0)
                    j = 0;
                else if(j > 255)
                    j = 255;
                tbuf[i] = j;
            }
        }
    else
        {
            for(i = 0; i < 256; i++)
                tbuf[i] = i;
        } for(ind = 0; ind < FSIZE; ind++)
    {
        /* pass components through tbuf[] to correct for possibly different
           0 - 100 % scaling */
        cy = tbuf[ind>>8];
        mk = tbuf[ind&255];
        CMhiInd[ind] = (cy>>CLOUBITS)|((mk>>MLOUBITS)<<CHIBITS);
        YKhiInd[ind] = ((cy>>YLOUBITS)|((mk>>KLOUBITS)<<YHIBITS))<<MCHIBITS;
        CMloInd[ind] =
            ( (mk >> MEXSHIFT)                << (MLOBITS+CLEOBITS))
            |( ((cy >> CEXSHIFT) & ((1<<CEXBITS)-1)) << CLOBITS)
            |( ((mk >> MUBITS) & ((1<<MLOBITS)-1)) << CLEOBITS)
            | ((cy >> CUBITS) & ((1<<CLOBITS)-1)) ;
        YKloInd[ind] =
            (( (mk >> KEXSHIFT)                <<(KLOBITS+YLEOBITS))
            |( ((mk >> KUBITS) & ((1<<KLOBITS)-1)) <<YLEOBITS)
            |( ((cy >> YEXSHIFT) & ((1<<YEXBITS)-1)) <<YLOBITS)
            |( (cy >> YUBITS) & ((1<<YLOBITS)-1)      )) <<MCLEOBITS;
    } return(0);
```

```c
err_ret:
    freetables();
    return(VR_ERR_NOMEM);
} static int
mkRGBDtables()
{
    int     ind,cl;
    int     K,Y,M,C;
    register int                                ki,yi,mi,ci,k,y,m,c,kk,yy,mm,cc;
    unsigned long           l;
    int     d[2][2][2][2][3];
    int     corner[3],sample[3];
    long kv[2][2][2][3];
    long yv[2][2][3];
    long mv[2][3];
    long cv[3];
    unsigned short cMhiInd[FSIZE];
    unsigned long yKhiInd[FSIZE];
    unsigned short cMloInd[FSIZE];
    unsigned long yKloInd[FSIZE];
    int cy,mk;

if(RGBD) return(0);

RGBD = (unsigned long *)vr_malloc(LSIZE*(1<<(KYMCEXBITS+KYMCLOBITS)));
    if(!RGBD)
        return(VR_ERR_NOMEM);

/* need to calculate local versions of CMhiInd[], YKhiInd[],
     * CMloInd[] and YKloInd[] since global versions include
     * adjustment to DS percentage range, which the file tables don't
     * include.
     */ for(ind = 0; ind < FSIZE; ind++)
    {
        cy = ind>>8;
        mk = ind&255;
```

```
    cMhiInd[ind] = (cy>>CLOUBITS)|((mk>>MLOUBITS)<<CHIBITS);
    yKhiInd[ind] = ((cy>>YLOUBITS)|((mk>>KLOUBITS)<<YHIBITS))<<MCHIBITS;
    cMloInd[ind] =
        ( (mk >> MEXSHIFT)              << (MLOBITS+CLEOBITS))
        |( ((cy >> CEXSHIFT) & ((1<<CEXBITS)-1)) << CLOBITS)
        |( ((mk >>  MUBITS) & ((1<<MLOBITS)-1)) << CLEOBITS)
        | ((cy >>   CUBITS) & ((1<<CLOBITS)-1)) ;
    yKloInd[ind] =
        (( (mk >> KEXSHIFT)              <<(KLOBITS+YLEOBITS))
        |( ((mk >>  KUBITS) & ((1<<KLOBITS)-1)) <<YLEOBITS)
        |( ((cy >> YEXSHIFT) & ((1<<YEXBITS)-1)) <<YLOBITS)
        |( (cy >>  YUBITS) & ((1<<YLOBITS)-1)    )) <<MCLEOBITS;
}

/* calculate delta table */
/* for each colorspace major region */
for(K = 0; K < CSIZE; K += (1<<KEXSHIFT))
for(Y = 0; Y < CSIZE; Y += (1<<YEXSHIFT))
for(M = 0; M < CSIZE; M += (1<<MEXSHIFT))
for(C = 0; C < CSIZE; C += (1<<CEXSHIFT))
{
    /* initialize d each corner */
    for(ki = 0; ki < 2; ki++)
    for(yi = 0; yi < 2; yi++)
    for(mi = 0; mi < 2; mi++)
    for(ci = 0; ci < 2; ci++)
    for(cl = 0; cl < 3; cl++)
        d[ki][yi][mi][ci][cl] = 0;

/* fill in d */
    /* for each box in the region */
    for(k = 0; k < (1<<KEXSHIFT); k+=(1<<KLOUBITS))
    for(y = 0; y < (1<<YEXSHIFT); y+=(1<<YLOUBITS))
    for(m = 0; m < (1<<MEXSHIFT); m+=(1<<MLOUBITS))
    for(c = 0; c < (1<<CEXSHIFT); c+=(1<<CLOUBITS))
    {
      for(ki = 0, kk = K+k; ki < 2; ki++,kk+=(1<<KLOUBITS))
      {
        if(kk > MAXCCOMP) kk -= (1<<KLOUBITS);
        for(yi = 0,yy = Y+y; yi < 2; yi++,yy+=(1<<YLOUBITS))
```

TABLE-BASED LINEAR IN  POLATION FOR COLOR CORRECTION SYS  AND METHOD- BOENKE PAGE 21

```
            {
                if(yy > MAXCCOMP) yy -= (1<<YLOUBITS);
                for(mi = 0, mm = M+m; mi < 2; mi++,mm+=(1<<MLOUBITS))
                {
                                        if(mm > MAXCCOMP) mm -= (1<<MLOUBITS);
                                        for(ci = 0, cc = C+c; ci < 2; ci++,cc+=(1<<CLOUBITS))
                                        {
                                            if(cc > MAXCCOMP) cc -= (1<<CLOUBITS);

l = RGB[cMhiInd[(cc<<8)|mm]+yKhiInd[(yy<<8)|kk]];
                                            sample[RedInd] = (int)((l>>RedShift)&255);
                                            sample[GreenInd] = (int)((l>>GreenShift)&255);
                                            sample[BlueInd] = (int)((l>>BlueShift)&255);

l = RGB[cMhiInd[((ci?cc-(1<<CLOUBITS):cc)<<8)
|(mi?mm-(1<<MLOUBITS):mm)]
                                                        +yKhiInd[((yi?yy-(1<<YLOUBITS):yy)<<8)
|(ki?kk-(1<<KLOUBITS):kk)]];

corner[RedInd] = (int)((l>>RedShift)&255);
                                            corner[GreenInd] = (int)((l>>GreenShift)&255);
                                            corner[BlueInd] = (int)((l>>BlueShift)&255);

for(cl = 0; cl < 3; cl++)
                                                d[ki][yi][mi][ci][cl] +=
                                                    corner[cl] - sample[cl];
                                        }
                    }
                }
            } for(ki = 0; ki < 2; ki++)
        for(yi = 0; yi < 2; yi++)
        for(mi = 0; mi < 2; mi++)
        for(ci = 0; ci < 2; ci++)
        for(cl = 0; cl < 3; cl++)
        {
            d[ki][yi][mi][ci][cl] =
                (d[ki][yi][mi][ci][cl]+(1<<(KYMCACCSHIFT-1)))>>KYMCACCSHIFT;
```

}

```
/* do 4-linear interpolation */
/* calculate initial k-interpolated values, kv shifted klobits bits */
for(yi = 0; yi < 2; yi++)
for(mi = 0; mi < 2; mi++)
for(ci = 0; ci < 2; ci++)
for(cl = 0; cl < 3; cl++)
   kv[yi][mi][ci][cl] = d[0][yi][mi][ci][cl]<<KLOBITS;

for(k = 0; k < (1<<KLOBITS); k++)
{
   /* calculate initial y-interpolated values,
      yv shifted klobits+ylobits bits */
   for(mi = 0; mi < 2; mi++)
   for(ci = 0; ci < 2; ci++)
   for(cl = 0; cl < 3; cl++)
      yv[mi][ci][cl] = kv[0][mi][ci][cl]<<YLOBITS;

for(y = 0; y < (1<<YLOBITS); y++)
   {
     /* calculate initial m-interpolated values,
        mv shifted klobits+ylobits+mlobits bits */
     for(ci = 0; ci < 2; ci++)
     for(cl = 0; cl < 3; cl++)
        mv[ci][cl] = yv[0][ci][cl]<<MLOBITS;

for(m = 0; m < (1<<MLOBITS); m++)
     {
        /* calculate initial c-interpolated values,
           cv shifted klobits+ylobits+mlobits+clobits bits */
        for(cl = 0; cl < 3; cl++)
                         cv[cl] = mv[0][cl]<<CLOBITS;

for(c = 0; c < (1<<CLOBITS); c++)
        {
                         for(cl = 0; cl < 3; cl++)
                         corner[cl] =
(int)(cv[cl]+(1<<(KYMCLOBITS-1)))>>(KYMCLOBITS);

/* force to be monotonic function... */
```

TABLE-BASED LINEAR INTERPOLATION FOR COLOR CORRECTION SYSTEM AND METHOD- BOENKE PAGE 23

```
                        for(cl = 0; cl < 3; cl++)
                          if(corner[cl] < 0) corner[cl] = 0;

ind = cMloInd[((C+(c<<CUBITS))<<8)+M+(m<<MUBITS)]
                          + yKloInd[((Y+(y<<YUBITS))<<8)+K+(k<<KUBITS)];

RGBD[ind] =
                          (corner[RedInd]<<RedShift) |
                                  (corner[GreenInd]<<GreenShift)|
                                          (corner[BlueInd]<<BlueShift);

#ifdef REAL_DEBUG       /* XXX: MAB test it */
                        if(k)
                        {
                          ind = cMloInd[((C+(c<<CUBITS))<<8)+M+(m<<MUBITS)]
                                  +
yKloInd[((Y+(y<<YUBITS))<<8)+K+((k-1)<<KUBITS)];
                          ind = RGBD[ind];
                          if(((ind>>RedShift)&255) > corner[RedInd]+1)
                                  serious_code_error();
                          if(((ind>>GreenShift)&255) > corner[GreenInd]+1)
                                  serious_code_error();
                          if(((ind>>BlueShift)&255) > corner[BlueInd]+1)
                                  serious_code_error();
                        }
                        if(y)
                        {
                          ind = cMloInd[((C+(c<<CUBITS))<<8)+M+(m<<MUBITS)]
                                  +
yKloInd[((Y+((y-1)<<YUBITS))<<8)+K+(k<<KUBITS)];
                          ind = RGBD[ind];
                          if(((ind>>RedShift)&255) > corner[RedInd]+1)
                                  serious_code_error();
                          if(((ind>>GreenShift)&255) > corner[GreenInd]+1)
                                  serious_code_error();
                          if(((ind>>BlueShift)&255) > corner[BlueInd]+1)
                                  serious_code_error();
                        }
                        if(m)
                        {
                          ind = cMloInd[((C+(c<<CUBITS))<<8)+M+((m-1)<<MUBITS)]
                                  +
```

TABLE-BASED LINEAR INTERPOLATION FOR COLOR CORRECTION SYSTEM AND METHOD- BOENKE PAGE 24

```
                yKloInd[((Y+(y<<YUBITS))<<8)+K+(k<<KUBITS)];
                        ind = RGBD[ind];
                        if(((ind>>RedShift)&255) > corner[RedInd]+1)
                                serious_code_error();
                        if(((ind>>GreenShift)&255) > corner[GreenInd]+1)
                                serious_code_error();
                        if(((ind>>BlueShift)&255) > corner[BlueInd]+1)
                                serious_code_error();
                }
                if(c)
                {
                    ind = cMloInd[((C+((c-1)<<CUBITS))<<8)+M+(m<<MUBITS)]
                                +
yKloInd[((Y+(y<<YUBITS))<<8)+K+(k<<KUBITS)];
                        ind = RGBD[ind];
                        if(((ind>>RedShift)&255) > corner[RedInd]+1)
                                serious_code_error();
                        if(((ind>>GreenShift)&255) > corner[GreenInd]+1)
                                serious_code_error();
                        if(((ind>>BlueShift)&255) > corner[BlueInd]+1)
                                serious_code_error();
                }
endif /* update c-interpolated values,
                           cv shifted klobits+ylobits+mlobits+clobits bits */
                        for(cl = 0; cl < 3; cl++)
                                cv[cl] +=
                                        mv[1][cl] - mv[0][cl];
        }
        /* update m-interpolated values,
           mv shifted klobits+ylobits+mlobits bits */
        for(ci = 0; ci < 2; ci++)
        for(cl = 0; cl < 3; cl++)
        {
                                mv[ci][cl] +=
                                        yv[1][ci][cl] - yv[0][ci][cl];
        }
}
/* update y-interpolated values,
   yv shifted klobits+ylobits bits */
```

TABLE-BASED LINEAR INTERPOLATION FOR COLOR CORRECTION SYSTEM AND METHOD- BOENKE PAGE 25

```
                for(mi = 0; mi < 2; mi++)
                for(ci = 0; ci < 2; ci++)
                for(cl = 0; cl < 3; cl++)
                {
                    yv[mi][ci][cl] +=
                                        kv[1][mi][ci][cl] - kv[0][mi][ci][cl];
                }
            }
            /* update k-interpolated values,
               kv shifted klobits bits */
            for(yi = 0; yi < 2; yi++)
            for(mi = 0; mi < 2; mi++)
            for(ci = 0; ci < 2; ci++)
            for(cl = 0; cl < 3; cl++)
            {
              kv[yi][mi][ci][cl] +=
                 d[1][yi][mi][ci][cl] - d[0][yi][mi][ci][cl];
            }

}
    }
    return(0);
} int
vr_cmyk_get_method()
{
    return(!!CMYK);
} static int
mkCMYKDtables()
{
    int      ind,cl;
    int      R,G,B;
    register int                       ri,gi,bi,r,g,b,rr,gg,bb;
    unsigned long              l;
    int      d[2][2][2][4];
    int      corner[4],sample[4];
    unsigned long              rv[2][2][4];
    unsigned long              gv[2][4];
```

```
unsigned long           bv[4];

if(CMYKD) return(0);

CMYKD = (unsigned long *) vr_malloc(LSIZE*(1<<(RGBEXBITS+RGBLOBITS)));
if(!CMYKD)
      return(VR_ERR_NOMEM);

/* calculate delta table */
ind = 0;
/* for each colorspace major region */
for(R = 0; R < CSIZE; R += (1<<REXSHIFT))
for(G = 0; G < CSIZE; G += (1<<GEXSHIFT))
for(B = 0; B < CSIZE; B += (1<<BEXSHIFT))
{
    /* initialize d each corner */
    for(ri = 0; ri < 2; ri++)
    for(gi = 0; gi < 2; gi++)
    for(bi = 0; bi < 2; bi++)
    for(cl = 0; cl < 4; cl++)
       d[ri][gi][bi][cl] = 0;

/* fill in d */
    /* for each box in the region */
    for(r = 0; r < (1<<REXSHIFT); r+=(1<<RLOUBITS))
    for(g = 0; g < (1<<GEXSHIFT); g+=(1<<GLOUBITS))
    for(b = 0; b < (1<<BEXSHIFT); b+=(1<<BLOUBITS))
    {
       for(ri = 0, rr = R+r; ri < 2; ri++,rr+=(1<<RLOUBITS))
       {
         if(rr > MAXCCOMP) rr -= (1<<RLOUBITS);
         for(gi = 0,gg = G+g; gi < 2; gi++,gg+=(1<<GLOUBITS))
         {
            if(gg > MAXCCOMP) gg -= (1<<GLOUBITS);
            for(bi = 0, bb = B+b; bi < 2; bi++,bb+=(1<<BLOUBITS))
            {
                         if(bb > MAXCCOMP) bb -= (1<<BLOUBITS);

l = CMYK[RhiInd[rr]+GhiInd[gg]+BhiInd[bb]];
                         sample[BlackIndex] = (int)((l>>BlackShift)&255);
                         sample[YellowIndex] = (int)((l>>YellowShift)&255);
```

```
                              sample[MagentaIndex] = (int)((l>>MagentaShift)&255);
                              sample[CyanIndex] = (int)((l>>CyanShift)&255);

l = CMYK[RhiInd[ri?rr-(1<<RLOUBITS):rr]
                                      +GhiInd[gi?gg-(1<<GLOUBITS):gg]
                                      +BhiInd[bi?bb-(1<<BLOUBITS):bb]];

corner[BlackIndex] = (int)((l>>BlackShift)&255);
                              corner[YellowIndex] = (int)((l>>YellowShift)&255);
                              corner[MagentaIndex] = (int)((l>>MagentaShift)&255);
                              corner[CyanIndex] = (int)((l>>CyanShift)&255);

for(cl = 0; cl < 4; cl++)
                                  d[ri][gi][bi][cl] +=
                                                  corner[cl] - sample[cl];
                    }
                }
            }
        } for(ri = 0; ri < 2; ri++)
        for(gi = 0; gi < 2; gi++)
        for(bi = 0; bi < 2; bi++)
        for(cl = 0; cl < 4; cl++)
        {
            d[ri][gi][bi][cl] =
                (d[ri][gi][bi][cl]+(1<<(RGBACCSHIFT-1)))>>RGBACCSHIFT;
        }

/* do 4-linear interpolation */
        /* calculate initial r-interpolated values, rv shifted rlobits bits */
        for(gi = 0; gi < 2; gi++)
        for(bi = 0; bi < 2; bi++)
        for(cl = 0; cl < 4; cl++)
            rv[gi][bi][cl] = d[0][gi][bi][cl]<<RLOBITS;

for(r = 0; r < (1<<RLOBITS); r++)
        {
            /* calculate initial g-interpolated values,
               gv shifted rlobits+globits bits */
            for(bi = 0; bi < 2; bi++)
```

```
    for(cl = 0; cl < 4; cl++)
      gv[bi][cl] = rv[0][bi][cl]<<GLOBITS;

for(g = 0; g < (1<<GLOBITS); g++)
   {
    /* calculate initial b-interpolated values,
        bv shifted rlobits+globits+blobits bits */
    for(cl = 0; cl < 4; cl++)
       bv[cl] = gv[0][cl]<<BLOBITS;

for(b = 0; b < (1<<BLOBITS); b++)
    {
       for(cl = 0; cl < 4; cl++)
                             corner[cl] =
                                 (int)(bv[cl]+(1<<(RGBLOBITS-1)))>>(RGBLOBITS);

/* force to be monotonic function... */
      for(cl = 0; cl < 4; cl++)
                             if(corner[cl] < 0) corner[cl] = 0;

CMYKD[ind] =
                             (corner[BlackIndex]<<BlackShift) |
                               (corner[YellowIndex]<<YellowShift) |
                                   (corner[MagentaIndex]<<MagentaShift) |
                                      (corner[CyanIndex]<<CyanShift);

ind++;

/* update b-interpolated values,
          bv shifted rlobits+globits+blobits bits */
      for(cl = 0; cl < 4; cl++)
                             bv[cl] += gv[1][cl] - gv[0][cl];

}
  }
  /* update g-interpolated values, gv shifted rlobits+globits bits */
  for(bi = 0; bi < 2; bi++)
  for(cl = 0; cl < 4; cl++)
  {
    gv[bi][cl] +=
       rv[1][bi][cl] - rv[0][bi][cl];
  }
 }
```

```
    /* update r-interpolated values, rv shifted rlobits bits */
    for(gi = 0; gi < 2; gi++)
    for(bi = 0; bi < 2; bi++)
    for(cl = 0; cl < 4; cl++)
    {
      rv[gi][bi][cl] +=
        d[1][gi][bi][cl] - d[0][gi][bi][cl];
    }
  } return(0);
}

/*
| ProcedurePrefaceBegin:C:1.0
|*********************************************************************
|
| Title:  vr_cmyk228_xbgr - Convert an array of CMYK228 pixels to xBGR.
|
| Abstract: This function converts an array of CMYK228 pixel type pixels to
|           RGB color model pixels.
|
| Usage:   vr_cmyk228_xbgr(VrAccess *dstasp, VrAccess *srcasp)
|
| Returns: Nothing.
|
|*********************************************************************
| ProcedurePrefaceEnd
*/ int
vr_cmyk228_xbgr(VrAccess *dstasp, VrAccess *srcasp)
{
  register unsigned long LastCMYK;
  unsigned long LastRGB;
  register int w;
  register unsigned char *a,*a2;
  int h;
  unsigned char *aa,*aa2;

if(!vr_inited) VR_RETURN_ERR_ERR(VR_ERR_NOT_INITED);
```

```
if((dstasp->PixelType != VR_PIXELTYPE_xBGR)
  || (srcasp->PixelType != VR_PIXELTYPE_CMYK228)) VR_RETURN_DIAG_VAL(1);

if(dstasp->SolidOk)
{
    if(srcasp->bufs[0].xinc || srcasp->bufs[0].yinc)
       dstasp->SolidOk = 0;
    else
       dstasp->bufs[0].xinc = dstasp->bufs[0].yinc = 0;
} if(RGB)
{
    /*
    * XXX: MAB 10/30/91 Note: this chunk of code has been highly
    * optimized for the SPARC architecture. Be careful if you
    * change it. ECR tends to spend A LOT of time here...
    */
    register unsigned long I,J;
    register unsigned long *YKhiIndP = YKhiInd;
    register unsigned long *YKloIndP = YKloInd;
    register unsigned short *CMhiIndP = CMhiInd;
    register unsigned short *CMloIndP = CMloInd;
    register unsigned char *RGBP = (unsigned char *)RGB;
    register unsigned char *RGBDRP = (unsigned char *)RGBDR;
    register unsigned long *RGBDP = RGBD;

/* lookup table version with interpolation */
    /* XXX: MAB Machine Dependent !!! */
    aa = srcasp->bufs[0].Data;
    aa2 = dstasp->bufs[0].Data;
    /* check for 4 byte alignment... */
    if(((int)aa&3)||((int)srcasp->bufs[0].xinc&3)||((int)srcasp->bufs[0].yinc&3)
       ||((int)aa2&3)||((int)dstasp->bufs[0].xinc&3)||((int)dstasp->bufs[0].yinc&3))
       return(1);
    LastCMYK = ~*(unsigned long *)aa;
    LastRGB = 0;
    h = dstasp->SolidOk?1:srcasp->ah;
    while(h > 0)
    {
       a = aa;
```

```
        a2 = aa2;
        w = dstasp->SolidOk?1:srcasp->aw;
        while(w > 0)
        {
          if(*(unsigned long *)a == LastCMYK)
            *(unsigned long *)a2 = LastRGB;
          else
          {
            LastCMYK = *(unsigned long *)a;
            I = (YKhiIndP[LastCMYK&0xFFFF] + CMhiIndP[LastCMYK>>16])<<2;
            J = YKloIndP[LastCMYK&0xFFFF] + CMloIndP[LastCMYK>>16];
            *(unsigned long *)a2 = LastRGB =
                                (*(unsigned long *)(RGBP+I))
                                    -((*(unsigned long *)(RGBDRP+I))&RGBDP[J]);
          }
          w--;
          a += srcasp->bufs[0].xinc;
          a2 += dstasp->bufs[0].xinc;
        }
        h--;
        aa += srcasp->bufs[0].yinc;
        aa2 += dstasp->bufs[0].yinc;
      }
} else {
      register int            B, G, R, ONE;

ONE = MAXCCOMP;

/* fast but simple version, method 0 */
      /* XXX: MAB Machine Dependent !!! */
      aa = srcasp->bufs[0].Data;
      aa2 = dstasp->bufs[0].Data;
      /* check for 4 byte alignment... */
      if(((int)aa&3)||((int)srcasp->bufs[0].xinc&3)||((int)srcasp->bufs[0].yinc&3)
         ||((int)aa2&3)||((int)dstasp->bufs[0].xinc&3)||((int)dstasp->bufs[0].yinc&3))
          return(1);
      LastCMYK = ~*(unsigned long *)aa;
      LastRGB = 0;
      h = dstasp->SolidOk?1:srcasp->ah;
      while(h > 0)
      {
```

```
                a = aa;
                a2 = aa2;
                w = dstasp->SolidOk?1:srcasp->aw;
                while(w > 0)
                {
                 if(*(unsigned long *)a == LastCMYK)
                    *(unsigned long *)a2 = LastRGB;
                 else
                 {
                   LastCMYK = *(unsigned long *)a;
                   B = vr_bits_228_8(a[3]);                    /* black */
                   R = ONE - B - vr_bits_228_8(a[0]);   /* cyan */
                   if(R < 0) R = 0;
                   G = ONE - B - vr_bits_228_8(a[1]);   /* magenta */
                   if(G < 0) G = 0;
                   B = ONE - B - vr_bits_228_8(a[2]);   /* yellow */
                   if(B < 0) B = 0;
                   a2[VideoIndex] = 0;
                   a2[RedIndex] = R;
                   a2[GreenIndex] = G;
                   a2[BlueIndex] = B;
                   LastRGB = *(unsigned long *)a2;
                 }
                 w--;
                 a += srcasp->bufs[0].xinc;
                 a2 += dstasp->bufs[0].xinc;
                }
                h--;
                aa += srcasp->bufs[0].yinc;
                aa2 += dstasp->bufs[0].yinc;
            }
     }
     return(0);
}

/*
| ProcedurePrefaceBegin:C:1.0
|*************************************************************
|
| Title: vr_cmyk_xbgr - Convert an array of CMYK pixels to xbgr.
|
```

```
| Abstract: This function converts an array of CMYK pixel type pixels to
|          RGB color model pixels.
|
| Usage:   vr_cmyk_xbgr(VrAccess *dstasp, VrAccess *srcasp)
|
| Returns: Nothing.
|
|***********************************************************************
| ProcedurePrefaceEnd
*/ int
vr_cmyk_xbgr(VrAccess *dstasp, VrAccess *srcasp)
{
    register unsigned long LastCMYK;
    unsigned long LastRGB;
    register int w;
    register unsigned char *a,*a2;
    int h;
    unsigned char *aa,*aa2;

if(!vr_inited) VR_RETURN_ERR_ERR(VR_ERR_NOT_INITED);
    if((dstasp->PixelType != VR_PIXELTYPE_xBGR)
       || (srcasp->PixelType != VR_PIXELTYPE_CMYK)) VR_RETURN_DIAG_VAL(1);

if(dstasp->SolidOk)
    {
        if(srcasp->bufs[0].xinc || srcasp->bufs[0].yinc)
            dstasp->SolidOk = 0;
        else
            dstasp->bufs[0].xinc = dstasp->bufs[0].yinc = 0;
    } if(RGB)
    {
        /*
         * XXX: MAB 10/30/91 Note: this chunk of code has been highly
         * optimized for the SPARC architecture. Be careful if you
         * change it. ECR tends to spend A LOT of time here...
         */
        register unsigned long I,J;
```

```
register unsigned long *YKhiIndP = YKhiInd;
register unsigned long *YKloIndP = YKloInd;
register unsigned short *CMhiIndP = CMhiInd;
register unsigned short *CMloIndP = CMloInd;
register unsigned char *RGBP = (unsigned char *)RGB;
register unsigned char *RGBDRP = (unsigned char *)RGBDR;
register unsigned long *RGBDP = RGBD;
register int i;

/* lookup table version with interpolation */
/* XXX: MAB Machine Dependent !!! */
aa = srcasp->bufs[0].Data;
aa2 = dstasp->bufs[0].Data;
/* check for 4 byte alignment... */
if(((int)aa&3)||((int)srcasp->bufs[0].xinc&3)||((int)srcasp->bufs[0].yinc&3)
   ||((int)aa2&3)||((int)dstasp->bufs[0].xinc&3)||((int)dstasp->bufs[0].yinc&3))
    return(1);
LastCMYK = ~*(unsigned long *)aa;
LastRGB = 0;
h = dstasp->SolidOk?1:srcasp->ah;
while(h > 0)
{
  a = aa;
  a2 = aa2;
  w = dstasp->SolidOk?1:srcasp->aw;
  while(w > 0)
  {
   if(*(unsigned long *)a == LastCMYK)
      *(unsigned long *)a2 = LastRGB;
   else
   {
      LastCMYK = *(unsigned long *)a;
      i = (vr_bits_8_228(a[0])<<8)+vr_bits_8_228(a[1]);
      I = CMhiIndP[i];
      J = CMloIndP[i];
      i = (vr_bits_8_228(a[2])<<8)+vr_bits_8_228(a[3]);
      I = (YKhiIndP[i] + I)<<2;
      J = YKloIndP[i] + J;
      *(unsigned long *)a2 = LastRGB =
                    (*(unsigned long *)(RGBP+I))
                      -((*(unsigned long *)(RGBDRP+I))&RGBDP[J]);
```

```
            }
            w--;
            a += srcasp->bufs[0].xinc;
            a2 += dstasp->bufs[0].xinc;
        }
        h--;
        aa += srcasp->bufs[0].yinc;
        aa2 += dstasp->bufs[0].yinc;
    }
} else {
    register int           B, G, R, ONE;

ONE = MAXCCOMP;

/* fast but simple version, method 0 */
    /* XXX: MAB Machine Dependent !!! */
    aa = srcasp->bufs[0].Data;
    aa2 = dstasp->bufs[0].Data;
    /* check for 4 byte alignment... */
    if(((int)aa&3)||((int)srcasp->bufs[0].xinc&3)||((int)srcasp->bufs[0].yinc&3)
        ||((int)aa2&3)||((int)dstasp->bufs[0].xinc&3)||((int)dstasp->bufs[0].yinc&3))
        return(1);
    LastCMYK = ~*(unsigned long *)aa;
    LastRGB = 0;
    h = dstasp->SolidOk?1:srcasp->ah;
    while(h > 0)
    {
        a = aa;
        a2 = aa2;
        w = dstasp->SolidOk?1:srcasp->aw;
        while(w > 0)
        {
            if(*(unsigned long *)a == LastCMYK)
                *(unsigned long *)a2 = LastRGB;
            else
            {
                LastCMYK = *(unsigned long *)a;
                B = a[3];                              /* black */
                R = ONE - B - a[0];    /* cyan */
                if(R < 0) R = 0;
                G = ONE - B - a[1];    /* magenta */
```

```
                if(G < 0) G = 0;
                B = ONE - B - a[2];    /* yellow */
                if(B < 0) B = 0;
                a2[VideoIndex] = 0;
                a2[RedIndex] = R;
                a2[GreenIndex] = G;
                a2[BlueIndex] = B;
                LastRGB = *(unsigned long *)a2;
            }
            w--;
            a += srcasp->bufs[0].xinc;
            a2 += dstasp->bufs[0].xinc;
        }
        h--;
        aa += srcasp->bufs[0].yinc;
        aa2 += dstasp->bufs[0].yinc;
    }
  }
  return(0);
}

/*
| ProcedurePrefaceBegin:C:1.0
|*********************************************************************
|
| Title:  vr_cmyk_inv_xbgr - Convert an array of CMYK_INV pixels to xbgr.
|
| Abstract: This function converts an array of CMYK_INV pixel type pixels to
|           RGB color model pixels.
|
| Usage:   vr_cmyk_inv_xbgr(VrAccess *dstasp, VrAccess *srcasp)
|
| Returns:  Nothing.
|
|*********************************************************************
| ProcedurePrefaceEnd
*/ int
vr_cmyk_inv_xbgr(VrAccess *dstasp, VrAccess *srcasp)
{
```

```c
register unsigned long LastCMYK;
unsigned long LastRGB;
register int w;
register unsigned char *a,*a2;
int h;
unsigned char *aa,*aa2;

if(!vr_inited) VR_RETURN_ERR_ERR(VR_ERR_NOT_INITED);
if((dstasp->PixelType != VR_PIXELTYPE_xBGR)
    || (srcasp->PixelType != VR_PIXELTYPE_CMYK)) VR_RETURN_DIAG_VAL(1);

if(dstasp->SolidOk)
{
    if(srcasp->bufs[0].xinc || srcasp->bufs[0].yinc)
        dstasp->SolidOk = 0;
    else
        dstasp->bufs[0].xinc = dstasp->bufs[0].yinc = 0;
} if(RGB)
{
    /*
     * XXX: MAB 10/30/91 Note: this chunk of code has been highly
     * optimized for the SPARC architecture. Be careful if you
     * change it. ECR tends to spend A LOT of time here...
     */
    register unsigned long I,J;
    register unsigned long *YKhiIndP = YKhiInd;
    register unsigned long *YKloIndP = YKloInd;
    register unsigned short *CMhiIndP = CMhiInd;
    register unsigned short *CMloIndP = CMloInd;
    register unsigned char *RGBP = (unsigned char *)RGB;
    register unsigned char *RGBDRP = (unsigned char *)RGBDR;
    register unsigned long *RGBDP = RGBD;
    register int i;

/* lookup table version with interpolation */
    /* XXX: MAB Machine Dependent !!! */
    aa = srcasp->bufs[0].Data;
    aa2 = dstasp->bufs[0].Data;
    /* check for 4 byte alignment... */
```

```
      if(((int)aa&3)||((int)srcasp->bufs[0].xinc&3)||((int)srcasp->bufs[0].yinc&3)
        ||((int)aa2&3)||((int)dstasp->bufs[0].xinc&3)||((int)dstasp->bufs[0].yinc&3))
        return(1);
      LastCMYK = ~*(unsigned long *)aa;
      LastRGB = 0;
      h = dstasp->SolidOk?1:srcasp->ah;
      while(h > 0)
      {
        a = aa;
        a2 = aa2;
        w = dstasp->SolidOk?1:srcasp->aw;
        while(w > 0)
        {
          if(*(unsigned long *)a == LastCMYK)
            *(unsigned long *)a2 = LastRGB;
          else
          {
            LastCMYK = *(unsigned long *)a;
            i = (vr_bits_8_228(255-a[0])<<8)+vr_bits_8_228(255-a[1]);
            I = CMhiIndP[i];
            J = CMloIndP[i];
            i = (vr_bits_8_228(255-a[2])<<8)+vr_bits_8_228(255-a[3]);
            I = (YKhiIndP[i] + I)<<2;
            J = YKloIndP[i] + J;
            *(unsigned long *)a2 = LastRGB =
                          (*(unsigned long *)(RGBP+I))
                              -((*(unsigned long *)(RGBDRP+I))&RGBDP[J]);
          }
          w--;
          a += srcasp->bufs[0].xinc;
          a2 += dstasp->bufs[0].xinc;
        }
        h--;
        aa += srcasp->bufs[0].yinc;
        aa2 += dstasp->bufs[0].yinc;
      }
    } else {
      register int             B, G, R, ONE;

ONE = MAXCCOMP;
```

```
/* fast but simple version, method 0 */
/* XXX: MAB Machine Dependent !!! */
aa = srcasp->bufs[0].Data;
aa2 = dstasp->bufs[0].Data;
/* check for 4 byte alignment... */
if(((int)aa&3)||((int)srcasp->bufs[0].xinc&3)||((int)srcasp->bufs[0].yinc&3)
   ||((int)aa2&3)||((int)dstasp->bufs[0].xinc&3)||((int)dstasp->bufs[0].yinc&3))
    return(1);
LastCMYK = ~*(unsigned long *)aa;
LastRGB = 0;
h = dstasp->SolidOk?1:srcasp->ah;
while(h > 0)
{
  a = aa;
  a2 = aa2;
  w = dstasp->SolidOk?1:srcasp->aw;
  while(w > 0)
  {
    if(*(unsigned long *)a == LastCMYK)
       *(unsigned long *)a2 = LastRGB;
    else
    {
      LastCMYK = *(unsigned long *)a;
      B = a[3];              /* 255-black */
      R = B + a[0] - ONE;    /* cyan */
      if(R < 0) R = 0;
      G = B + a[1] - ONE;    /* magenta */
      if(G < 0) G = 0;
      B = B + a[2] - ONE;    /* yellow */
      if(B < 0) B = 0;
      a2[VideoIndex] = 0;
      a2[RedIndex] = R;
      a2[GreenIndex] = G;
      a2[BlueIndex] = B;
      LastRGB = *(unsigned long *)a2;
    }
    w--;
    a += srcasp->bufs[0].xinc;
    a2 += dstasp->bufs[0].xinc;
  }
  h--;
```

```
            aa += srcasp->bufs[0].yinc;
            aa2 += dstasp->bufs[0].yinc;
        }
    }
    return(0);
} void
VrCMYK228RGBSingle(int c, int m, int y, int k, int *r, int *g, int *b)
{
    if(!vr_inited) VR_RETURN_DIAG;

if(RGB)
    {
        register unsigned long I,J;
        register unsigned long *YKhiIndP = YKhiInd;
        register unsigned long *YKloIndP = YKloInd;
        register unsigned short *CMhiIndP = CMhiInd;
        register unsigned short *CMloIndP = CMloInd;
        register unsigned char *RGBP = (unsigned char *)RGB;
        register unsigned char *RGBDRP = (unsigned char *)RGBDR;
        register unsigned long *RGBDP = RGBD;

/* lookup table version with interpolation */
        /* XXX: MAB Machine Dependent !!! */
        I = (CMhiIndP[(c<<CSHIFT)|m]+YKhiIndP[(y<<CSHIFT)|k])<<2;
        J = CMloIndP[(c<<CSHIFT)|m]+YKloIndP[(y<<CSHIFT)|k];
        I = (*(unsigned long *)(RGBP+I))
            -((*(unsigned long *)(RGBDRP+I))&RGBDP[J]);
        *r = (I>>RedShift)&0xFF;
        *g = (I>>GreenShift)&0xFF;
        *b = (I>>BlueShift)&0xFF;
    } else {
        /* fast but simple version, method 0 */
        k = MAXCCOMP - vr_bits_228_8(k);
        c = k - vr_bits_228_8(c);
        if(c < 0) c = 0;
        else if(c > MAXCCOMP) c = MAXCCOMP;
        *r = c;
        c = k - vr_bits_228_8(m);
        if(c < 0) c = 0;
```

```c
        else if(c > MAXCCOMP) c = MAXCCOMP;
        *g = c;
        c = k - vr_bits_228_8(y);
        if(c < 0) c = 0;
        else if(c > MAXCCOMP) c = MAXCCOMP;
        *b = c;
    }
} void
VrCMYKRGBSingle(int c, int m, int y, int k, int *r, int *g, int *b)
{
    if(!vr_inited) VR_RETURN_DIAG;
    if(RGB)
    {
        register unsigned long I,J;
        register unsigned long *YKhiIndP = YKhiInd;
        register unsigned long *YKloIndP = YKloInd;
        register unsigned short *CMhiIndP = CMhiInd;
        register unsigned short *CMloIndP = CMloInd;
        register unsigned char *RGBP = (unsigned char *)RGB;
        register unsigned char *RGBDRP = (unsigned char *)RGBDR;
        register unsigned long *RGBDP = RGBD;

/* lookup table version with interpolation */
        /* XXX: MAB Machine Dependent !!! */
        c = vr_bits_8_228(c);
        m = vr_bits_8_228(m);
        y = vr_bits_8_228(y);
        k = vr_bits_8_228(k);
        I = (CMhiIndP[(c<<CSHIFT)|m]+YKhiIndP[(y<<CSHIFT)|k])<<2;
        J = CMloIndP[(c<<CSHIFT)|m]+YKloIndP[(y<<CSHIFT)|k];
        I = (*(unsigned long *)(RGBP+I))
            -((*(unsigned long *)(RGBDRP+I))&RGBDP[J]);
        *r = (I>>RedShift)&0xFF;
        *g = (I>>GreenShift)&0xFF;
        *b = (I>>BlueShift)&0xFF;
    } else {
        /* fast but simple version, method 0 */
        k = MAXCCOMP - k;
        c = k - c;
```

```
            if(c < 0) c = 0;
            *r = c;
            c = k - m;
            if(c < 0) c = 0;
            *g = c;
            c = k - y;
            if(c < 0) c = 0;
            *b = c;
    }
}

/*
| ProcedurePrefaceBegin:C:1.0
|*******************************************************************
|
| Title: vr_xbgr_cmyk - Convert an array of RGB pixels to CMYK.
|
| Abstract: This function converts an array of RGB color model pixels to
|           CMYK pixel type pixels.
|
| Usage:    vr_xbgr_cmyk(VrAccess *dstasp, VrAccess *srcasp)
|
| Returns: Nothing.
|
|*******************************************************************
| ProcedurePrefaceEnd
*/ int
vr_xbgr_cmyk(VrAccess *dstasp, VrAccess *srcasp)
{
    register unsigned long LastRGB;
    unsigned long LastCMYK;
    register int w;
    register unsigned char *a,*a2;
    int h;
    unsigned char *aa,*aa2;

if(!vr_inited) VR_RETURN_ERR_ERR(VR_ERR_NOT_INITED);
    if((srcasp->PixelType != VR_PIXELTYPE_xBGR)
        || (dstasp->PixelType != VR_PIXELTYPE_CMYK)) VR_RETURN_DIAG_VAL(1);
```

TABLE-BASED LINEAR INTERPOLATION FOR COLOR CORRECTION SYS' AND METHOD- BOENKE PAGE 43

```
if(dstasp->SolidOk)
{
    if(srcasp->bufs[0].xinc || srcasp->bufs[0].yinc)
        dstasp->SolidOk = 0;
    else
        dstasp->bufs[0].xinc = dstasp->bufs[0].yinc = 0;
} if(CMYK)
{
    /*
     * XXX: MAB 10/30/91 Note: this chunk of code has been highly
     * optimized for the SPARC architecture. Be careful if you
     * change it. ECR tends to spend A LOT of time here...
     */
    register unsigned long I,J;

/* lookup table version with interpolation */
    /* XXX: MAB Machine Dependent !!! */
    aa = srcasp->bufs[0].Data;
    aa2 = dstasp->bufs[0].Data;
    /* check for 4 byte alignment... */
    if(((int)aa&3)||((int)srcasp->bufs[0].xinc&3)||((int)srcasp->bufs[0].yinc&3)
        ||((int)aa2&3)||((int)dstasp->bufs[0].xinc&3)||((int)dstasp->bufs[0].yinc&3))
        return(1);
    LastRGB = ~*(unsigned long *)aa;
    LastCMYK = 0;
    h = dstasp->SolidOk?1:srcasp->ah;
    while(h > 0)
    {
        a = aa;
        a2 = aa2;
        w = dstasp->SolidOk?1:srcasp->aw;
        while(w > 0)
        {
            /* lookup table version plus interpolation */
            if(*(unsigned long *)a == LastRGB)
                *(unsigned long *)a2 = LastCMYK;
            else
            {
```

```
                LastRGB = *(unsigned long *)a;
                I = RhiInd[a[RedIndex]]
                                +GhiInd[a[GreenIndex]]
                                        + BhiInd[a[BlueIndex]];
                J = RloInd[a[RedIndex]]
                                +GloInd[a[GreenIndex]]
                                        + BloInd[a[BlueIndex]];
                *(unsigned long *)a2 = CMYK[I] - (CMYKDR[I]&CMYKD[J]);
                a2[0] = vr_bits_228_8(a2[0]);
                a2[1] = vr_bits_228_8(a2[1]);
                a2[2] = vr_bits_228_8(a2[2]);
                a2[3] = vr_bits_228_8(a2[3]);
                LastCMYK = *(unsigned long *)a2;
            }
            w--;
            a += srcasp->bufs[0].xinc;
            a2 += dstasp->bufs[0].xinc;
        }
        h--;
        aa += srcasp->bufs[0].yinc;
        aa2 += dstasp->bufs[0].yinc;
    }
} else {
    register unsigned int        Y,M,C,K,ONE;

ONE = MAXCCOMP;

/* fast but simple version, method 0 */
    /* XXX: MAB Machine Dependent !!! */
    aa = srcasp->bufs[0].Data;
    aa2 = dstasp->bufs[0].Data;
    /* check for 4 byte alignment... */
    if(((int)aa&3)||((int)srcasp->bufs[0].xinc&3)||((int)srcasp->bufs[0].yinc&3)
        ||((int)aa2&3)||((int)dstasp->bufs[0].xinc&3)||((int)dstasp->bufs[0].yinc&3))
        return(1);
    LastRGB = ~*(unsigned long *)aa;
    LastCMYK = 0;
    h = dstasp->SolidOk?1:srcasp->ah;
    while(h > 0)
    {
        a = aa;
```

TABLE-BASED LINEAR INTERPOLATION FOR COLOR CORRECTION SYSTEM AND METHOD- BOENKE PAGE 45

```c
      a2 = aa2;
      w = dstasp->SolidOk?1:srcasp->aw;
      while(w > 0)
      {
       if(*(unsigned long *)a == LastRGB)
          *(unsigned long *)a2 = LastCMYK;
       else
       {
          LastRGB = *(unsigned long *)a;
          Y = ONE - a[BlueIndex];
          M = ONE - a[GreenIndex];
          C = ONE - a[RedIndex];

/* ----- K = Minimum(Y, M, C); */
          K = Y;
          if (M < K)
                              K = M;
          if (C < K)
                              K = C;
          a2[0] = C - K;      /* cyan */
          a2[1] = M - K;      /* magenta */
          a2[2] = Y - K;      /* yellow */
          a2[3] = K;                          /* black */
          LastCMYK = *(unsigned long *)a2;
       }
       w--;
       a += srcasp->bufs[0].xinc;
       a2 += dstasp->bufs[0].xinc;
      }
      h--;
      aa += srcasp->bufs[0].yinc;
      aa2 += dstasp->bufs[0].yinc;
    }
  }
  return(0);
}

/*
| ProcedurePrefaceBegin:C:1.0
|*********************************************************************
|
```

TABLE-BASED LINEAR INT~ ~POLATION FOR COLOR CORRECTION SYS~ ~ AND METHOD- BOENKE PAGE 46

```
| Title: vr_xbgr_cmyk228 - Convert an array of RGB pixels to CMYK228.
|
| Abstract: This function converts an array of RGB color model pixels to
|          CMYK228 pixel type pixels.
|
| Usage:   vr_xbgr_cmyk228(VrAccess *dstasp, VrAccess *srcasp)
|
| Returns: Nothing.
|
|*****************************************************************
| ProcedurePrefaceEnd
*/ int
vr_xbgr_cmyk228(VrAccess *dstasp, VrAccess *srcasp)
{
    register unsigned long LastRGB;
    unsigned long LastCMYK;
    register int w;
    register unsigned char *a,*a2;
    int h;
    unsigned char *aa,*aa2;

if(!vr_inited) VR_RETURN_ERR_ERR(VR_ERR_NOT_INITED);
    if((srcasp->PixelType != VR_PIXELTYPE_xBGR)
        || (dstasp->PixelType != VR_PIXELTYPE_CMYK228)) VR_RETURN_DIAG_VAL(1);

if(dstasp->SolidOk)
    {
        if(srcasp->bufs[0].xinc || srcasp->bufs[0].yinc)
            dstasp->SolidOk = 0;
        else
            dstasp->bufs[0].xinc = dstasp->bufs[0].yinc = 0;
    } if(CMYK)
    {
        /*
         * XXX: MAB 10/30/91 Note: this chunk of code has been highly
         * optimized for the SPARC architecture. Be careful if you
         * change it. ECR tends to spend A LOT of time here...
```

TABLE-BASED LINEAR INTERPOLATION FOR COLOR CORRECTION SYSTEM AND METHOD- BOENKE PAGE 47

```c
*/
register unsigned long I,J;

/* lookup table version with interpolation */
/* XXX: MAB Machine Dependent !!! */
aa = srcasp->bufs[0].Data;
aa2 = dstasp->bufs[0].Data;
/* check for 4 byte alignment... */
if(((int)aa&3)||((int)srcasp->bufs[0].xinc&3)||((int)srcasp->bufs[0].yinc&3)
   ||((int)aa2&3)||((int)dstasp->bufs[0].xinc&3)||((int)dstasp->bufs[0].yinc&3))
    return(1);
LastRGB = ~*(unsigned long *)aa;
LastCMYK = 0;
h = dstasp->SolidOk?1:srcasp->ah;
while(h > 0)
{
  a = aa;
  a2 = aa2;
  w = dstasp->SolidOk?1:srcasp->aw;
  while(w > 0)
  {
  /* lookup table version plus interpolation */
    if(*(unsigned long *)a == LastRGB)
       *(unsigned long *)a2 = LastCMYK;
    else
    {
      LastRGB = *(unsigned long *)a;
      I = RhiInd[a[RedIndex]]
                       +GhiInd[a[GreenIndex]]
                          + BhiInd[a[BlueIndex]];
      J = RloInd[a[RedIndex]]
                       +GloInd[a[GreenIndex]]
                          + BloInd[a[BlueIndex]];
      *(unsigned long *)a2 = LastCMYK =
                       CMYK[I] - (CMYKDR[I]&CMYKD[J]);
   }
   w--;
   a += srcasp->bufs[0].xinc;
   a2 += dstasp->bufs[0].xinc;
  }
  h--;
```

```
                aa += srcasp->bufs[0].yinc;
                aa2 += dstasp->bufs[0].yinc;
        }
    } else {
        register unsigned int        Y,M,C,K,ONE;

ONE = MAXCCOMP;

/* fast but simple version, method 0 */
        /* XXX: MAB Machine Dependent !!! */
        aa = srcasp->bufs[0].Data;
        aa2 = dstasp->bufs[0].Data;
        /* check for 4 byte alignment... */
        if(((int)aa&3)||((int)srcasp->bufs[0].xinc&3)||((int)srcasp->bufs[0].yinc&3)
           ||((int)aa2&3)||((int)dstasp->bufs[0].xinc&3)||((int)dstasp->bufs[0].yinc&3))
            return(1);
        LastRGB = ~*(unsigned long *)aa;
        LastCMYK = 0;
        h = dstasp->SolidOk?1:srcasp->ah;
        while(h > 0)
        {
            a = aa;
            a2 = aa2;
            w = dstasp->SolidOk?1:srcasp->aw;
            while(w > 0)
            {
                if(*(unsigned long *)a == LastRGB)
                    *(unsigned long *)a2 = LastCMYK;
                else
                {
                    LastRGB = *(unsigned long *)a;
                    Y = ONE - a[BlueIndex];
                    M = ONE - a[GreenIndex];
                    C = ONE - a[RedIndex];

/* ----- K = Minimum(Y, M, C); */
                    K = Y;
                    if (M < K)
                                    K = M;
                    if (C < K)
                                    K = C;
```

```
                a2[0] = vr_bits_8_228(C - K);    /* cyan */
                a2[1] = vr_bits_8_228(M - K);    /* magenta */
                a2[2] = vr_bits_8_228(Y - K);    /* yellow */
                a2[3] = vr_bits_8_228(K);        /* black */
                LastCMYK = *(unsigned long *)a2;
            }
            w--;
            a += srcasp->bufs[0].xinc;
            a2 += dstasp->bufs[0].xinc;
        }
        h--;
        aa += srcasp->bufs[0].yinc;
        aa2 += dstasp->bufs[0].yinc;
    }
}
return(0);
} void
VrRGBCMYK228Single(int r, int g, int b, int *c, int *m, int *y, int *k)
{
    if(!vr_inited) VR_RETURN_DIAG;
    if(CMYK)
    {
        register unsigned long I,J;

/* lookup table version plus interpolation */
        I = RhiInd[r] + GhiInd[g] + BhiInd[b];
        J = RloInd[r] + GloInd[g] + BloInd[b];
        I = CMYK[I] - (CMYKDR[I]&CMYKD[J]);
        *c = (I>>CyanShift)&0xFF;
        *m = (I>>MagentaShift)&0xFF;
        *y = (I>>YellowShift)&0xFF;
        *k = (I>>BlackShift)&0xFF;
    } else {
        register unsigned int      Y,M,C,K;

K = MAXCCOMP;

Y = K - b;
        M = K - g;
```

```
        C = K - r;

/* ---- K = Minimum(Y, M, C); */
        K = Y;
        if (M < K)
            K = M;
        if (C < K)
            K = C;
        *y = vr_bits_8_228(Y - K);
        *m = vr_bits_8_228(M - K);
        *c = vr_bits_8_228(C - K);
        *k = vr_bits_8_228(K);
    }
} void
VrRGBCMYKSingle(int r, int g, int b, int *c, int *m, int *y, int *k)
{
    if(!vr_inited) VR_RETURN_DIAG;
    if(CMYK)
    {
        register unsigned long I,J;

/* lookup table version plus interpolation */
        I = RhiInd[r] + GhiInd[g] + BhiInd[b];
        J = RloInd[r] +GloInd[g] + BloInd[b];
        I = CMYK[I] - (CMYKDR[I]&CMYKD[J]);
        *c = vr_bits_228_8((I>>CyanShift)&0xFF);
        *m = vr_bits_228_8((I>>MagentaShift)&0xFF);
        *y = vr_bits_228_8((I>>YellowShift)&0xFF);
        *k = vr_bits_228_8((I>>BlackShift)&0xFF);
    } else {
        register unsigned int        Y,M,C,K;

K = MAXCCOMP;

Y = K - b;
        M = K - g;
        C = K - r;

/* ---- K = Minimum(Y, M, C); */
```

TABLE-BASED LINEAR  ERPOLATION FOR COLOR CORRECTION   EM AND METHOD- BOENKE PAGE 51

```
        K = Y;
        if (M < K)
            K = M;
        if (C < K)
            K = C;
        *y = Y - K;
        *m = M - K;
        *c = C - K;
        *k = K;
    }
}

/* ----------------------- End of file --------------------------- */
```

What is claimed is:

1. A computer-implemented method for transforming a first color in a first color space to a second color in a second color space different from the first color space, comprising the steps of:

producing a nominal transform color from a sampled lookup table storing a plurality of transforms of a subset of preselected colors in the first color space to corresponding colors in the second color space;

producing a delta value from a delta lookup table storing a plurality of interpolation values of a subset of possible colors in the second color space; and combining said nominal transform color and said delta value to create the second color.

2. A computer-implemented method for transforming a first color in a first color space to a second color in a second color space, comprising the steps of:

producing a nominal transform color, responsive to the first color, from a sampled lookup table storing preselected values representing transforms of preselected ones of a plurality of colors in the first color space into corresponding ones of a plurality of colors in the second color space;

determining a region of the second color space in which said nominal transform color is located;

producing a delta value, responsive to said region and a magnitude of a variation of the first color from a closest one of said preselected ones of said plurality of colors in the first color space, from a delta table storing a plurality of preselected interpolation values from the second color space, that for a particular region and a particular variation magnitude, are constant; and combining said delta value and said nominal transform color to produce the second color.

3. The computer implemented method of claim 2 wherein said step of determining a region includes the step of choosing from at least two regions responsive to the first color.

4. The computer implemented method of claim 2 wherein said step of producing a delta value further comprises the step of:

restricting a magnitude of an interpolation value retrieved from said delta table so that when said delta value and said nominal transform color are combined, no overflow or underflow occurs.

5. A data processing apparatus for converting a first color in a first color space to a second color in a second color space, comprising:

a sampled lookup table storing a plurality of transforms of a subset of preselected colors in the first color to corresponding colors in the second color space;

a delta lookup table storing a plurality of interpolation values of a subset of possible colors in the second color space; and a processor for:
retrieving a particular one of said plurality of transforms, responsive to a particular one of said subset of preselected colors closest to the first color, from said sampled lookup table;
retrieving a particular one of said plurality of interpolation values from said delta lookup table; and
combining said particular transform and said particular interpolation value to create the second color.

* * * * *